United States Patent
Tsai et al.

(10) Patent No.: US 11,487,393 B2
(45) Date of Patent: Nov. 1, 2022

(54) METHOD FOR PREPARING STACKING STRUCTURE, STACKING STRUCTURE AND TOUCH SENSOR

(71) Applicant: Cambrios Film Solutions Corporation, Tortola (VG)

(72) Inventors: Yi-Chen Tsai, Chiayi (TW); Wei-Chia Fang, Zhubei (TW); Chun-Hung Chu, Hsinchu (TW); Chung-Chin Hsiao, Zhubei (TW); Meng-Yun Wu, Yilan County (TW); Tsu-Hsuan Lai, New Taipei (TW); Wei-Cheng Hsu, New Taipei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 17/036,014

(22) Filed: Sep. 29, 2020

(65) Prior Publication Data

US 2022/0100314 A1 Mar. 31, 2022

(51) Int. Cl.
*G06F 3/044* (2006.01)

(52) U.S. Cl.
CPC .......... *G06F 3/0445* (2019.05); *G06F 3/0446* (2019.05); *G06F 2203/04103* (2013.01); *G06F 2203/04112* (2013.01)

(58) Field of Classification Search
CPC ................ G06F 3/0445; G06F 3/0446; G06F 2203/04103; G06F 2203/04112
See application file for complete search history.

(56) References Cited

U.S. PATENT DOCUMENTS

| 2016/0103520 A1* | 4/2016 | Kim | G06F 3/0446 345/174 |
| 2019/0243491 A1* | 8/2019 | Tsai | G06F 3/04164 |
| 2021/0357074 A1* | 11/2021 | Xu | G06F 3/041 |

FOREIGN PATENT DOCUMENTS

| JP | 2013105275 A | 5/2013 |
| JP | 2015210706 A | 11/2015 |
| JP | 2019212299 A | 12/2019 |
| TW | 201543140 A | 11/2015 |
| TW | 201604735 A | 2/2016 |
| TW | M521770 U | 5/2016 |
| TW | 201939236 A | 10/2019 |
| WO | 2012090446 A1 | 7/2012 |

* cited by examiner

*Primary Examiner* — Deeprose Subedi
(74) *Attorney, Agent, or Firm* — Cooper Legal Group, LLC

(57) ABSTRACT

A method for preparing stacking structure includes providing a substrate; disposing a metallic layer and a silver nanowire layer on the substrate; applying flexographic printing technology to print an anti-etching layer on a surface of the metallic layer or the silver nanowire layer so that the anti-etching layer partially covers the metallic layer or the silver nanowire layer; applying an etching technology to remove a part of the metallic layer or the silver nanowire layer that is not covered by the anti-etching layer and the metallic layer or the silver nanowire layer disposed therebelow with an etching liquid so that the metallic layer comprises: metallic wires; a metallic grid; and a metallic plate; and removing the anti-etching layer. A stacking structure comprises: the substrate; the metallic layer; and the silver nanowire layer. The method for preparing stacking structure and the stacking structure can be applied to a touch sensor.

29 Claims, 15 Drawing Sheets

1

```
┌─────────────────────────┐
│ providing a substrate;  │──S1
└─────────────────────────┘
             ↓
┌──────────────────────────────────────┐
│ disposing a metallic layer and a     │
│ silver nanowire layer on the         │──S2
│ substrate;                           │
└──────────────────────────────────────┘
             ↓
``` applying flexographic printing technology to print an anti-etching layer on a surface of layer so that the anti-etching layer partially covers the metallic layer or the silver nanowire layer, wherein the anti-etching layer comprises: a wire pattern; a grid pattern connected with the wire pattern; and a covering area which covers the metallic layer or the silver nanowire layer, and connects with the grid pattern; — S3 applying an etching technology to remove the part of the metallic layer and the silver nanowire layer that is not covered by the anti-etching layer and the metallic layer or the silver nanowire layer disposed therebelow with an etching liquid so that the metallic layer comprises: metallic wires, which correspond to the wire pattern of the anti-etching layer; a metallic grid, which corresponds to the grid pattern of the anti-etching layer, and connects with the metallic wires; and a metallic plate, which corresponds to the covering area of the anti-etching layer, and connects with the metallic grid; and — S4 removing the anti-etching layer. — S5

METHOD FOR PREPARING STACKING STRUCTURE, STACKING STRUCTURE AND TOUCH SENSOR

BACKGROUND

1. Field of the Disclosure

The present disclosure relates to a method for preparing a stacking structure, and in particular to a method for preparing a stacking structure by applying flexographic printing technology. The present disclosure also relates to a stacking structure, and in particular to a stacking structure which comprises a metallic layer having a metallic grid and a metallic plate. The present disclosure also relates to a touch sensor, and in particular to a touch sensor which comprises the stacking structure.

2. Description of the Related Art

A stacking structure which comprises silver nanowires and a metallic layer can be applied to a touch sensor. The conventional method for preparing the stacking structure involves performing a one-time etching process by photolithography in the presence of copper and nano-silver to define a trace area TA and a visual area VA. The conventional stacking structures which are formed by applying the above method for preparing the stacking structure are shown as FIGS. 1, 2 and 3. Referring to FIGS. 1 and 2, the conventional stacking structure 10 comprises: a substrate 11; a metallic layer 13 which is disposed on the substrate 11, wherein the metallic layer 13 comprises a metallic sheet 131 and metallic wires 132; and a silver nanowire layer 14 which is disposed on the metallic layer 13. Further, in another embodiment of the conventional stacking structure as shown in FIG. 3, the conventional stacking structure 10 further comprises: a catalyst layer 12 which is disposed between the substrate 11 and the metallic layer 13. The conventional stacking structure comprises: a trace area TA which comprises the metallic wires 132; a first lap-over area 15 which comprises an area in the metallic sheet 131 relatively adjacent to the metallic wires 132; a second lap-over area 16 which comprises an area in the metallic sheet 131 relatively distant from the metallic wires 132; and a visible area VA which comprises an area adjacent to one side of the metallic sheet 131, covered by the silver nanowire layer 14 and not covered by the metallic sheet 131.

In the stacking structure formed by applying the conventional method for preparing the stacking structure, both the first lap-over area 15 and the second lap-over area 16 are composed of solid copper with a whole (i.e., uniform or continuous) surface, so the process is relatively cumbersome and expensive. Therefore, it is necessary to provide a novel method for preparing stacking structure, stacking structure, and touch sensor.

BRIEF SUMMARY OF THE INVENTION

To improve the problems existing in the conventional method for preparing the stacking structure, which is relatively cumbersome and expensive, the main objective of the disclosure is to provide a novel method for preparing stacking structure, stacking structure and touch sensor.

To achieve the above objective and other objectives, the present disclosure provides a method for preparing stacking structure, which comprises: providing a substrate; disposing a metallic layer and a silver nanowire layer on the substrate; applying flexographic printing technology to print an anti-etching layer on a surface of the metallic layer or a surface of the silver nanowire layer so that the anti-etching layer partially covers the metallic layer or the silver nanowire layer, wherein the anti-etching layer comprises: a wire pattern; a grid pattern connected with the wire pattern; and a covering area which covers the metallic layer or the silver nanowire layer and connects with the grid pattern; applying an etching technology to remove a part of the metallic layer or a part of the silver nanowire layer that is not covered by the anti-etching layer and the metallic layer or the silver nanowire layer disposed therebelow with an etching liquid so that the metallic layer comprises: metallic wires, which correspond to the wire pattern of the anti-etching layer; a metallic grid, which corresponds to the grid pattern of the anti-etching layer and connects with the metallic wires; and a metallic plate, which corresponds to the covering area of the anti-etching layer and connects with the metallic grid; and removing the anti-etching layer.

In the method of preparation, the silver nanowire layer may be disposed on the metallic layer, and the anti-etching layer may be printed on the surface of the silver nanowire layer.

In the method of preparation, the metallic layer may be disposed by applying chemical plating technology.

In the method of preparation, the metallic layer may be disposed on the silver nanowire layer, and the anti-etching layer may be printed on the surface of the metallic layer.

In the method of preparation, a material of the metallic layer may be selected from the group consisting of copper, copper-nickel alloy, copper-lead alloy, silver, silver-nickel alloy, and silver-lead alloy.

In the method of preparation, a material of the substrate may be selected from the group consisting of polyethylene terephthalate (PET), cyclic olefin copolymer (COP), colorless polyimide (CPI), polyethylene naphthalate (PEN), polycarbonate (PC), and polyethersulfone (PES).

To achieve the above objective and other objectives, the present disclosure also provides a stacking structure, which comprises: a substrate; a metallic layer, which is disposed on the substrate, wherein the metallic layer comprises: metallic wires; a metallic grid, which is connected to the metallic wires; and a metallic plate, which is connected to the metallic grid; and a silver nanowire layer, which is disposed on the substrate, wherein the silver nanowire layer at least partially overlaps with the metallic layer.

In the stacking structure, the silver nanowire layer may be disposed on the metallic layer.

The stacking structure may further comprise: a catalyst layer which is disposed below the metallic layer.

In the stacking structure, the metallic layer may be disposed on the silver nanowire layer.

In the stacking structure, a material of the metallic layer may be selected from the group consisting of copper, copper-nickel alloy, copper-lead alloy, silver, silver-nickel alloy, and silver-lead alloy.

In the stacking structure, a material of the substrate may be selected from the group consisting of polyethylene terephthalate (PET), cyclic olefin copolymer (COP), colorless polyimide (CPI), polyethylene naphthalate (PEN), polycarbonate (PC), and polyethersulfone (PES).

In the stacking structure, the stacking structure may comprise: a trace area, which comprises the metallic wires; a first lap-over area, which comprises the metallic grid; a second lap-over area, which comprises the metallic plate; and a visible area, which comprises an area adjacent to one side of the metallic plate, covered by the silver nanowire layer and not covered by the metallic plate. In the trace area, the first lap-over area, and the second lap-over area, the silver nanowire layer may have a pattern corresponding to the metallic layer.

In the stacking structure, a total width of the first lap-over area and the second lap-over area may be less than 500 μm, and a ratio of a width of the first lap-over area to a width of the second lap-over area may be between 0.05 and 20.

In the stacking structure, a total width of the first lap-over area and the second lap-over area may be between 0.5 mm and 1.0 mm, and a ratio of a width of the first lap-over area to a width of the second lap-over area may be between 0.03 and 35.

In the stacking structure, a total width of the first lap-over area and the second lap-over area may be between 1.0 mm and 1.5 mm, and a ratio of a width of the first lap-over area to a width of the second lap-over area may be between 0.02 and 50.

In the stacking structure, a total width of the first lap-over area and the second lap-over area may be between 1.5 mm and 2.5 mm, and a ratio of a width of the first lap-over area to a width of the second lap-over area may be between 0.01 and 100.

In the stacking structure, a ratio of a total width of the first lap-over area and the second lap-over area to a width of the trace area may be 2:1, the metallic layer may comprise 1-50 metallic wires, and a ratio of a width of the first lap-over area to a width of the second lap-over area may be between 0.05 and 20.

In the stacking structure, a ratio of a total width of the first lap-over area and the second lap-over area to a width of the trace area may be 1:1, the metallic layer may comprise 10-100 metallic wires, and a ratio of a width of the first lap-over area to a width of the second lap-over area may be between 0.03 and 35.

In the stacking structure, a ratio of a total width of the first lap-over area and the second lap-over area to a width of the trace area may be 3:1, the metallic layer may comprise 1-50 metallic wires, and a ratio of a width of the first lap-over area to a width of the second lap-over area may be between 0.02 and 50.

In the stacking structure, a pitch of the metallic grid of the first lap-over area to a pitch of the metallic wires may be 0.1-10 times, and a line width of the metallic grid of the first lap-over area to a line width of the metallic wires may be 0.1-5 times.

In the stacking structure, the metallic wires have a pitch of 20 μm, a line width of 10 μm and a line space of 10 μm, and the metallic grid of the first lap-over area has a pitch between 2 μm and 200 μm and a line width between about 2 μm and 50 μm.

In the stacking structure, a line width/line space of the metallic grid of the first lap-over area may be 5 μm/5 μm, 10 μm/5 μm, 15 μm/5 μm, 20 μm/5 μm, 40 μm/5 μm, 50 μm/5 μm, 50 μm/150 μm, 40 μm/150 μm, 30 μm/150 μm or 20 μm/150 μm.

In the stacking structure, the metallic wires have a pitch of 40 μm, a line width of 20 μm and a line space of 20 μm, and the metallic grid of the first lap-over area has a pitch between 4 μm and 400 μm and a line width between about 4 μm and 100 μm.

In the stacking structure, a line width/line space of the metallic grid of the first lap-over area may be 20 μm/5 μm, 40 μm/5 μm, 80 μm/5 μm, 100 μm/5 μm, 20 μm/80 μm, 40 μm/60 μm, 100 μm/200 μm or 100 μm/300 μm.

In the stacking structure, the metallic wires have a line width between 3 μm and 30 μm, and a line space between 3 μm and 30 μm.

The stacking structure may further comprise: a bonding pad, which is disposed on the substrate, comprising: a bonding metallic layer, which is disposed on the substrate, wherein the bonding metallic layer comprises: a bonding metallic grid; a bonding metallic plate, which is connected to the bonding metallic grid; and a bonding silver nanowire layer, which is disposed on the substrate.

To achieve the above objective and other objectives, the present disclosure also provides a touch sensor, which comprises: the above-mentioned stacking structure; and a covering layer, which is disposed on the metallic layer or the silver nanowire layer of the above-mentioned stacking structure.

The touch sensor may further comprise: a second metallic layer, which is disposed below the substrate in the above-mentioned stacking structure, wherein the second metallic layer comprises: second metallic wires; a second metallic grid, which is connected to the second metallic wires; and a second metallic plate, which is connected to the second metallic grid; a second silver nanowire layer, which is disposed below the substrate, wherein the second silver nanowire layer at least partially overlaps with the second metallic layer; and a second covering layer, which is disposed below the second metallic layer and the second silver nanowire layer.

The method for preparing the stacking structure of the present disclosure can effectively define the first lap-over area and the second lap-over area with different pattern designs to form a differentiated special stacking design and can dispense with the exposure and development process, thereby solving the problem of double-sided exposure, decreasing wastewater treatment and reducing costs to improve performance.

The stacking structure and the touch sensor comprising the stacking structure of the disclosure can decrease the consumption of metallic raw materials in order to reduce the preparation cost of the stacking structure and the touch sensor comprising the stacking structure.

BRIEF DESCRIPTION OF THE DRAWINGS

FIG. 4 is a flow sheet of a method for preparing a stacking structure of the present disclosure.

DETAILED DESCRIPTION OF THE INVENTION

The implementation of the present invention is illustrated by the specific embodiments as follows, so one skilled in the art may understand other advantages and effects of the present invention by the contents disclosed in the specification. The present invention may also be implemented or applied by other embodiments, and the details in the specification may also be based on different views and applications without departing from the spirit of the present invention for various modifications and variations.

Unless otherwise stated herein, the singular forms of "a" and "the" used in the specification and the appended claims include the plural meaning.

Unless otherwise stated herein, the technical term of "or" used in the specification and the appended claims comprises the meaning of "or/and".

Figure 7:
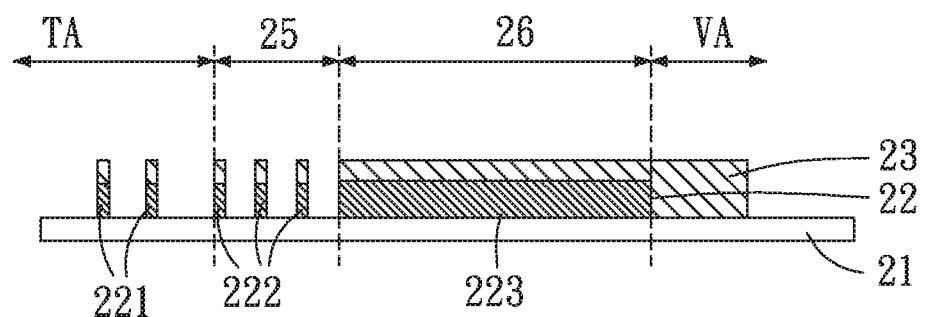
FIG. 7 is a schematic sectional view of the stacking structure along A-A section according to the embodiment 2 of the present disclosure.

The "width" of the first lap-over area and the second lap-over area described herein indicates a width of the first lap-over area and the second lap-over area on A-A section as shown in FIG. 7.

The "pitch" described herein indicates the shortest distance between the central axis of the metallic wire and the central axis of the adjacent other metallic wire, or the shortest distance between the central axis of the metallic line and the central axis of the adjacent other metallic line in the metallic grid.

The "line space" described herein indicates the shortest distance between the edge of the metallic wire and the edge of the adjacent other metallic wire, or the shortest distance between the edge of the metallic line and the edge of the adjacent other metallic line in the metallic grid.

Embodiment 1

FIG. 4 is a flow sheet of a method 1 for preparing a stacking structure according to Embodiment 1 of the disclosure. As shown in FIG. 4, the method 1 for preparing a stacking structure according to Embodiment 1 of the disclosure comprises: S1, providing a substrate; S2, disposing a metallic layer and a silver nanowire layer on the substrate; S3, applying flexographic printing technology to print an anti-etching layer on a surface of the metallic layer or the silver nanowire layer so that the anti-etching layer partially covers the metallic layer or the silver nanowire layer, wherein the anti-etching layer comprises: a wire pattern; a grid pattern connected with the wire pattern; and a covering area which covers the metallic layer or the silver nanowire layer, and connects with the grid pattern; S4, applying an etching technology to remove the part of the metallic layer or the silver nanowire layer that is not covered by the anti-etching layer and the metallic layer or the silver nanowire layer disposed therebelow with an etching liquid so that the metallic layer comprises: metallic wires, which correspond to the wire pattern of the anti-etching layer; a metallic grid, which corresponds to the grid pattern of the anti-etching layer, and connects with the metallic wires; and a metallic plate, which corresponds to the covering area of the anti-etching layer, and connects with the metallic grid; and S5, removing the anti-etching layer.

In the method 1 of preparation of the embodiment, the material of the substrate used in the step S1 is not specifically limited. For example a suitable material comprises, but is not limited to, polyethylene terephthalate (PET), cyclic olefin copolymer (COP), colorless polyimide (CPI), polyethylene naphthalate (PEN), polycarbonate (PC), and/or polyethersulfone (PES).

In the method 1 of preparation of the embodiment, the step S2 applies a conventional technology to dispose a metallic layer and a silver nanowire layer on the substrate. For example, the metallic layer can be disposed on the substrate by applying chemical plating technology, sputtering technology, or photolithography technology. For example, the silver nanowire layer can be disposed on the substrate by coating, and the relative position of the metallic layer and the silver nanowire layer is not specifically limited. In one embodiment, the silver nanowire layer is disposed on the metallic layer; and in another embodiment, the metallic layer is disposed on the silver nanowire layer. The composition of the metallic layer is not specifically limited, as long as it can provide proper conductivity. For example, the material of the metallic layer may be copper, copper-nickel alloy, copper-lead alloy, silver, silver-nickel alloy, and/or silver-lead alloy, but the present disclosure is not limited thereto.

In the method 1 of preparation of the embodiment, the step S3 applies a conventional flexographic printing technology to print an anti-etching layer on the metallic layer or the silver nanowire layer. In the step S3, the material of the anti-etching layer is not specifically limited, as long as it can be ensured that the part of the metallic layer or the silver nanowire layer covered by the anti-etching layer is not etched by an etching liquid in the subsequent step S4.

In the method 1 of preparation of the embodiment, the step S4 applies a conventional etching technology to remove the part of the metallic layer or the silver nanowire layer that is not covered by the anti-etching layer and the metallic layer or the silver nanowire layer disposed therebelow with an etching liquid. The etching liquid used in the step S4 is not specifically limited, as long as it can remove the part of the metallic layer or the silver nanowire layer that is not covered by the anti-etching layer and the metallic layer or the silver nanowire layer disposed therebelow by a one-time etch or etching twice in batches.

In the method 1 of preparation of the embodiment, the anti-etching layer printed in the step S3 comprises: a wire pattern; a grid pattern connected with the wire pattern; and a covering area which covers the metallic layer or the silver nanowire layer, and connects with the grid pattern so that the metallic layer after etching in the subsequent step S4 comprises: metallic wires, which correspond to the wire pattern of the anti-etching layer; a metallic grid, which corresponds to the grid pattern of the anti-etching layer, and connects with the metallic wires; and a metallic plate, which corresponds to the covering area of the anti-etching layer, and connects with the metallic grid. By the above technical means, the stacking structure made by the preparation method 1 of the embodiment may have a structure as described in Embodiment 2, Embodiment 3 or Embodiment 4 below, so that it can be applied to a touch sensor.

Figure 1:
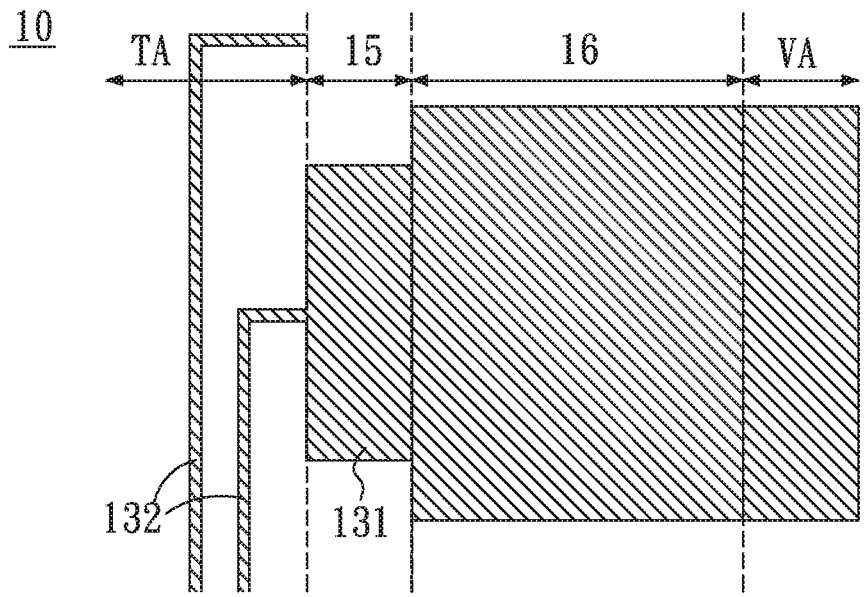
FIG. 1 is a schematic view of a conventional stacking structure.
Figure 2:
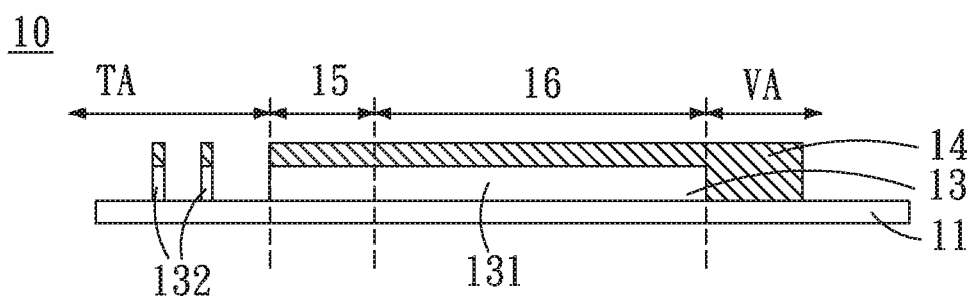
FIG. 2 is a schematic sectional view of the conventional stacking structure.
Figure 3:
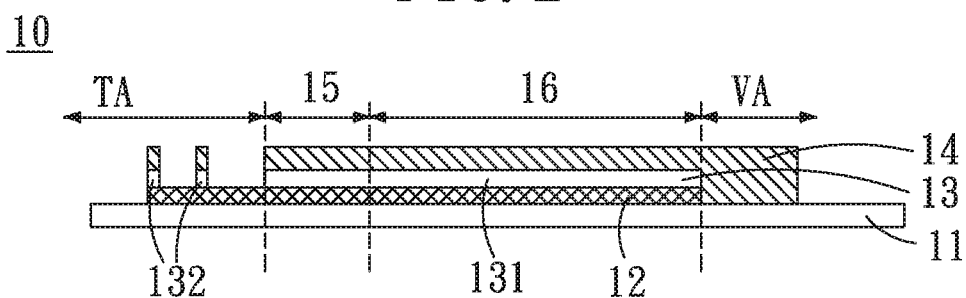
FIG. 3 is a schematic sectional view of a conventional stacking structure of another embodiment.
Figure 5:
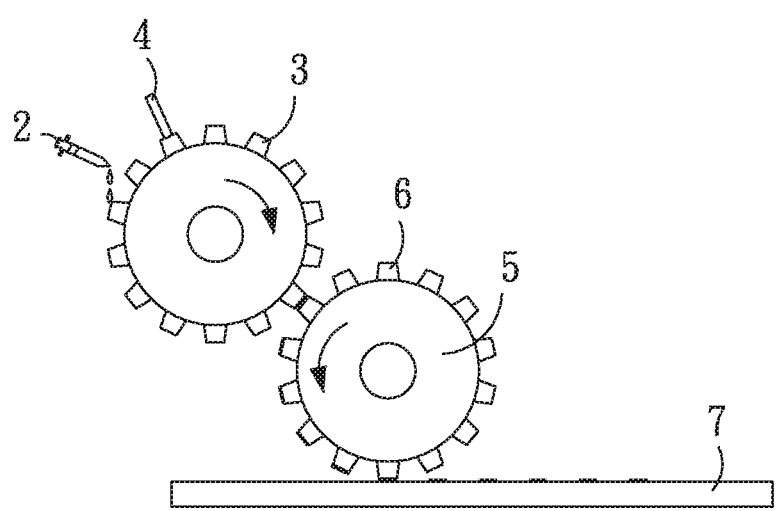
FIG. 5 is a schematic view of an exemplary flexographic printing technology.

FIG. 5 illustrates the flexographic printing technology applied in step S3 of the preparation method of the embodiment, but the present disclosure is not limited thereto. As shown in FIG. 5, the exemplary flexographic printing technology applies an ink supply 2 to add ink drops to an anilox roller 3, and then scrapes excess ink from the anilox roller 3 by a scraper (doctor blade) 4. Next, the ink on the anilox roller 3 is transferred to a flexo plate 6 on a plate cylinder 5. Finally, the ink on the flexo plate 6 is transferred to a printed object 7 to print the desired pattern on the printed object 7.

Embodiment 2

Figure 6:
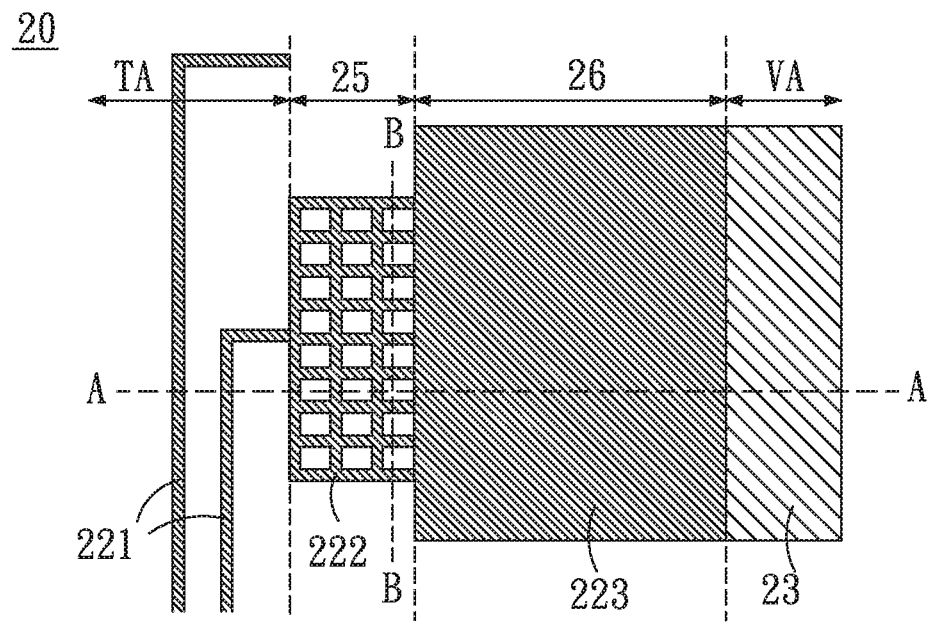
FIG. 6 is a schematic view of the stacking structure according to the embodiment 2 of the present disclosure.
Figure 8:
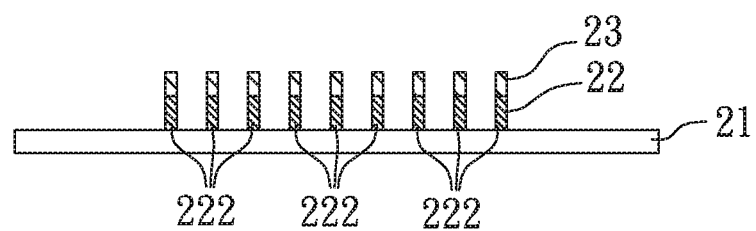
FIG. 8 is a schematic sectional view of the stacking structure along B-B according to the embodiment 2 section of the present disclosure.
Figure 9:
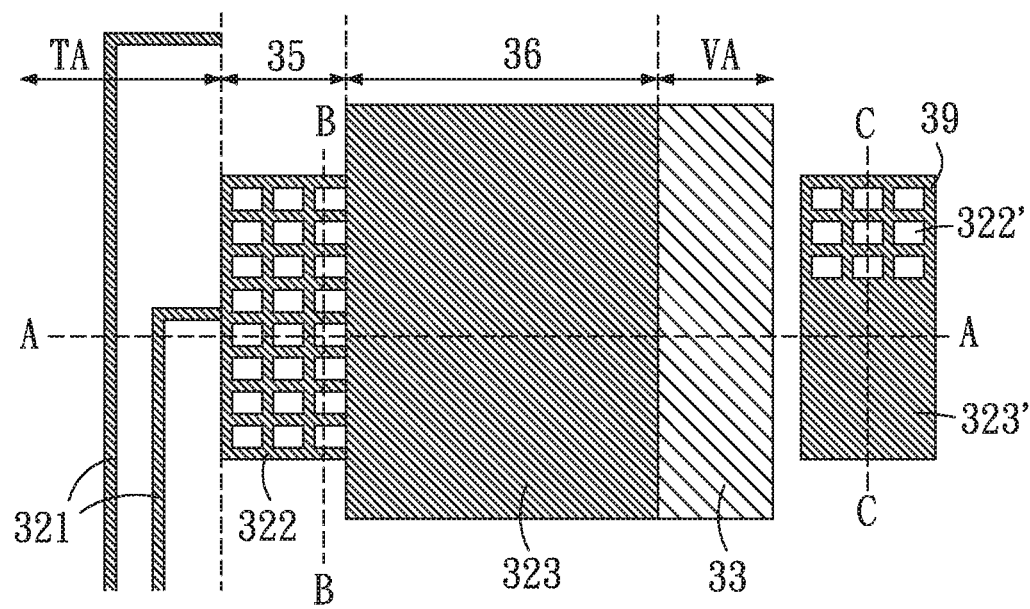
FIG. 9 is a schematic view of the stacking structure according to the embodiment 3 of the present disclosure.
Figure 10:
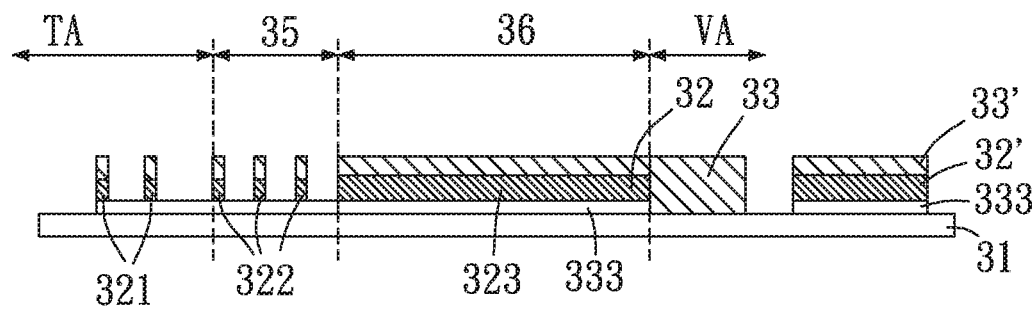
FIG. 10 is a schematic sectional view of the stacking structure along A-A section according to the embodiment 3 of the present disclosure.
Figure 11:
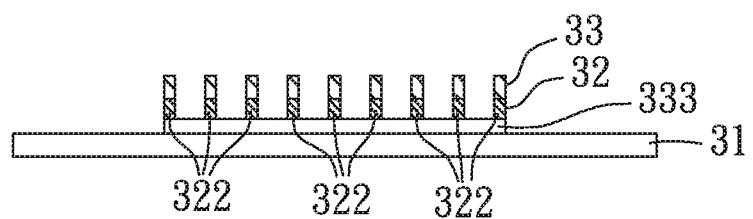
FIG. 11 is a schematic sectional view of the stacking structure along B-B section according to the embodiment 3 of the present disclosure.
Figure 12:
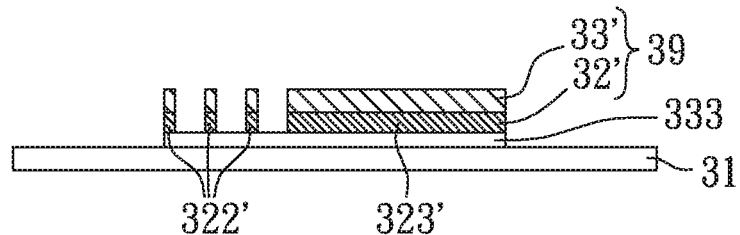
FIG. 12 is a schematic sectional view of the stacking structure along C-C section according to the embodiment 3 of the present disclosure.

FIG. 6, FIG. 7 and FIG. 8 are schematic views of the stacking structure 20 of Embodiment 2 of the present disclosure. As shown in FIG. 6, FIG. 7 and FIG. 8, the stacking structure 20 of the embodiment comprises: a substrate 21 (not shown in FIG. 6); a metallic layer 22, which is disposed on the substrate 21, wherein the metallic layer 22 comprises: metallic wires 221; a metallic grid 222, which is connected to the metallic wires 221; and a metallic plate 223, which is connected to the metallic grid 222; and a silver nanowire layer 23, which is disposed on the substrate 21, wherein the silver nanowire layer 23 at least partially overlaps with the metallic layer 22.

The stacking structure 20 of the embodiment comprises: a trace area TA, which comprises the metallic wires 221; a first lap-over area 25, which comprises the metallic grid 222; a second lap-over area 26, which comprises the metallic plate 223; and a visible area VA, which comprises an area adjacent to one side of the metallic plate 223, covered by the silver nanowire layer 23 and not covered by the metallic plate 223. In the trace area TA, the first lap-over area 25, and the second lap-over area 26, the silver nanowire layer 23 has a pattern corresponding to the metallic layer 22.

In the embodiment, the silver nanowire layer 23 of the stacking structure 20 is located on the metallic layer 22, but the present disclosure is not limited thereto. In another embodiment, the metallic layer 22 may be located on the silver nanowire layer 23. That is, the relative position of the metallic layer 22 and the silver nanowire layer 23 in the stacking structure 20 of the present disclosure can be exchanged with each other.

In the embodiment, the material of the substrate 21 of the stacking structure 20 is not specifically limited. For example, a suitable material comprises, but is not limited to, polyethylene terephthalate (PET), cyclic olefin copolymer (COP), colorless polyimide (CPI), polyethylene naphthalate (PEN), polycarbonate (PC), and/or polyethersulfone (PES).

In the embodiment, the composition of the metallic layer 22 of the stacking structure 20 is not specifically limited, as long as it can provide proper conductivity. For example, the material of the metallic layer 22 may be copper, copper-nickel alloy, copper-lead alloy, silver, silver-nickel alloy, and/or silver-lead alloy, but the present disclosure is not limited thereto.

In an embodiment, a total width of the first lap-over area 25 and the second lap-over area 26 of the stacking structure 20 of the embodiment is less than 500 µm, and the ratio of the width of the first lap-over area 25 to the width of the second lap-over area 26 is between 0.05 and 20.

In an embodiment, a total width of the first lap-over area 25 and the second lap-over area 26 of the stacking structure 20 of the embodiment is between 0.5 mm and 1.0 mm, and the ratio of the width of the first lap-over area 25 to the width of the second lap-over area 26 is between 0.03 and 35.

In an embodiment, a total width of the first lap-over area 25 and the second lap-over area 26 of the stacking structure 20 of the embodiment is between 1.0 mm and 1.5 mm, and the ratio of the width of the first lap-over area 25 to the width of the second lap-over area 26 is between 0.02 and 50.

In an embodiment, a total width of the first lap-over area 25 and the second lap-over area 26 of the stacking structure 20 of the embodiment is between 1.5 mm and 2.5 mm, and the ratio of the width of the first lap-over area 25 to the width of the second lap-over area 26 is between 0.01 and 100.

In an embodiment, the ratio of a total width of the first lap-over area 25 and the second lap-over area 26 to the width of the trace area TA of the stacking structure 20 of the embodiment is 2:1, the metallic layer 22 comprises 1-50 metallic wires 221, and the ratio of the width of the first lap-over area 25 to the width of the second lap-over area 26 is between 0.05 and 20.

In an embodiment, the ratio of a total width of the first lap-over area 25 and the second lap-over area 26 to the width of the trace area TA of the stacking structure 20 of the embodiment is 1:1, the metallic layer 22 comprises 10-100 metallic wires 221, and the ratio of the width of the first lap-over area 25 to the width of the second lap-over area 26 is between 0.03 and 35.

In an embodiment, the ratio of a total width of the first lap-over area 25 and the second lap-over area 26 to the width of the trace area TA of the stacking structure 20 of the embodiment is 3:1, the metallic layer 22 comprises 1-50 metallic wires 221, and the ratio of the width of the first lap-over area 25 to the width of the second lap-over area 26 is between 0.02 and 50.

In an embodiment, the pitch of the metallic grid 222 of the first lap-over area 25 to the pitch of the metallic wires 221 of the stacking structure 20 of the embodiment is 0.1-10 times, and the line width of the metallic grid 222 of the first lap-over area 25 to the line width of the metallic wires 221 is 0.1-5 times.

In an embodiment, the metallic wires 221 of the stacking structure 20 of the embodiment have the pitch of 20 µm, the line width of 10 µm and the line space of 10 µm, and the metallic grid 222 of the first lap-over area 25 has the pitch between 2 µm and 200 µm and the line width between about 2 µm and 50 µm.

In an embodiment, the line width/line space of the metallic grid 222 of the first lap-over area 25 of the stacking structure 20 of the embodiment is 5 μm/5 μm, 10 μm/5 μm, 15 μm/5 μm, 20 μm/5 μm, 40 μm/5 μm, 50 μm/5 μm, 50 μm/150 μm, 40 μm/150 μm, 30 μm/150 μm or 20 μm/150 μm.

In an embodiment, the metallic wires 221 of the stacking structure 20 of the embodiment have the pitch of 40 μm, the line width of 20 μm and the line space of 20 μm, and the metallic grid 222 of the first lap-over area 25 has the pitch between 4 μm and 400 μm and the line width between about 4 μm and 100 μm.

In an embodiment, the line width/line space of the metallic grid 222 of the first lap-over area 25 of the stacking structure 20 of the embodiment is 20 μm/5 μm, 40 μm/5 μm, 80 μm/5 μm, 100 μm/5 μm, 20 μm/80 μm, 40 μm/60 μm, 100 μm/200 μm or 100 μm/300 μm.

In an embodiment, the metallic wires 221 of the stacking structure 20 of the embodiment have the line width between 3 μm and 30 μm and the line space between 3 μm and 30 μm.

In an embodiment, the reliability of the touch sensor comprising the stacking structure 20 can further be enhanced by controlling the total width of the first lap-over area 25 and the second lap-over area 26 to be in a specific range, but the present disclosure is not limited thereto. The total width of the first lap-over area 25 and the second lap-over area 26 can be appropriately adjusted by a person having ordinarily knowledge in the art based on the size of the stacking structure 20.

In an embodiment, the reliability of the touch sensor comprising the stacking structure 20 can be further enhanced by controlling the ratio of the total width of the first lap-over area 25 and the second lap-over area 26 to the width of the trace area TA to be in a specific range, but the present disclosure is not limited thereto. The ratio of the total width of the first lap-over area 25 and the second lap-over area 26 to the width of the trace area TA can be appropriately adjusted by a person having ordinarily knowledge in the art based on the size of the stacking structure 20.

For example, the stacking structure 20 of the embodiment may be prepared by the method 1 of preparation as described in the Embodiment 1, but the present disclosure is not limited thereto.

Embodiment 3

FIG. 9, FIG. 10, FIG. 11 and FIG. 12 are schematic views of the stacking structure 30 of Embodiment 3 of the present disclosure. As shown in FIG. 9, FIG. 10, FIG. 11 and FIG. 12, the stacking structure 30 of the embodiment comprises: a substrate 31 (not shown in FIG. 9); a metallic layer 32, which is disposed on the substrate 31, wherein the metallic layer 32 comprises: metallic wires 321; a metallic grid 322, which is connected to the metallic wires 321; and a metallic plate 323, which is connected to the metallic grid 322; and a silver nanowire layer 33, which is disposed on the substrate 31, wherein the silver nanowire layer 33 at least partially overlaps with the metallic layer 32.

The stacking structure 30 of the embodiment comprises: a trace area TA, which comprises the metallic wires 321; a first lap-over area 35, which comprises the metallic grid 322; a second lap-over area 36, which comprises the metallic plate 323; and a visible area VA, which comprises an area adjacent to one side of the metallic plate 323, covered by the silver nanowire layer 33 and not covered by the metallic plate 323. In the trace area TA, the first lap-over area 35, and the second lap-over area 36, the silver nanowire layer 33 has a pattern corresponding to the metallic layer 32.

Compared to Embodiment 2, the stacking structure 30 of the embodiment further comprises: a catalyst layer 333 (not shown in FIG. 9), which is disposed below the metallic layer 32.

With the incorporation of the catalyst layer 333 of the embodiment, the metallic layer 32 is plated on the catalyst layer 333 by applying chemical plating technology to dispose the metallic layer 32 on the catalyst layer 333.

Compared to Embodiment 2, the stacking structure 30 of the embodiment further comprises: a bonding pad 39, which is disposed on the substrate 31. The bonding pad 39 comprises: a bonding metallic layer 32', which is disposed on the substrate 31, wherein the bonding metallic layer 32' comprises: a bonding metallic grid 322'; and a bonding metallic plate 323', which is connected to the bonding metallic grid 322'; and a bonding silver nanowire layer 33', which is disposed on the substrate 31.

The bonding pad 39 of the embodiment can be a contact for connecting an external circuit.

Embodiment 4

Figure 13:
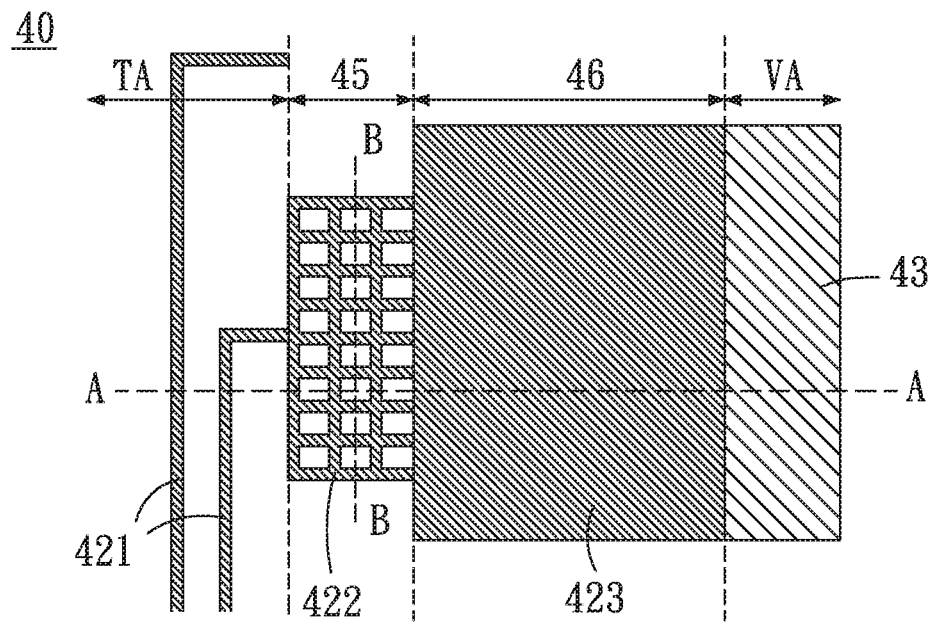
FIG. 13 is a schematic view of a touch sensor according to the embodiment 4 of the present disclosure.
Figure 14:
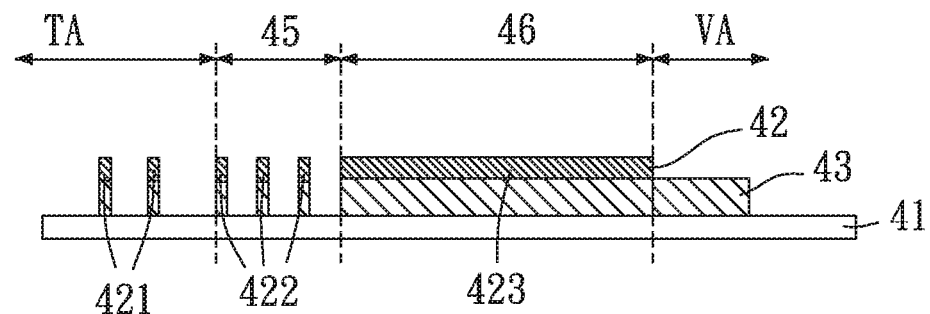
FIG. 14 is a schematic sectional view of the stacking structure along A-A section according to the embodiment 4 of the present disclosure.
Figure 15:
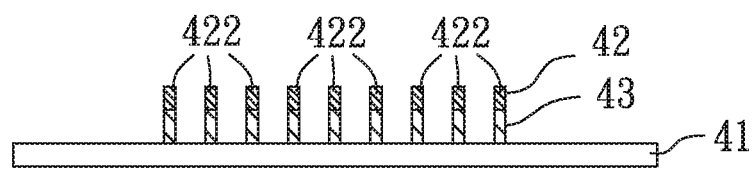
FIG. 15 is a schematic sectional view of the stacking structure along B-B section according to the embodiment 4 of the present disclosure.

FIG. 13, FIG. 14 and FIG. 15 are schematic views of the stacking structure 40 of Embodiment 4 of the present disclosure. As shown in FIG. 13, FIG. 14 and FIG. 15, the stacking structure 40 of the embodiment comprises: a substrate 41 (not shown in FIG. 13); a metallic layer 42, which is disposed on the substrate 41, wherein the metallic layer 42 comprises: metallic wires 421; a metallic grid 422, which is connected to the metallic wires 421; and a metallic plate 423, which is connected to the metallic grid 422; and a silver nanowire layer 43, which is disposed on the substrate 41, wherein the silver nanowire layer 43 at least partially overlaps with the metallic layer 42.

The stacking structure 40 of the embodiment comprises: a trace area TA, which comprises the metallic wires 421; a first lap-over area 45, which comprises the metallic grid 422; a second lap-over area 46, which comprises the metallic plate 423; and a visible area VA, which comprises an area adjacent to one side of the metallic plate 423, covered by the silver nanowire layer 43 and not covered by the metallic plate 423. In the trace area TA, the first lap-over area 45, and the second lap-over area 46, the silver nanowire layer 43 has a pattern corresponding to the metallic layer 42.

Compared to Embodiment 2, the metallic layer 42 of the stacking structure 40 of the embodiment is located on the silver nanowire layer 43.

Embodiment 5

Figure 16:
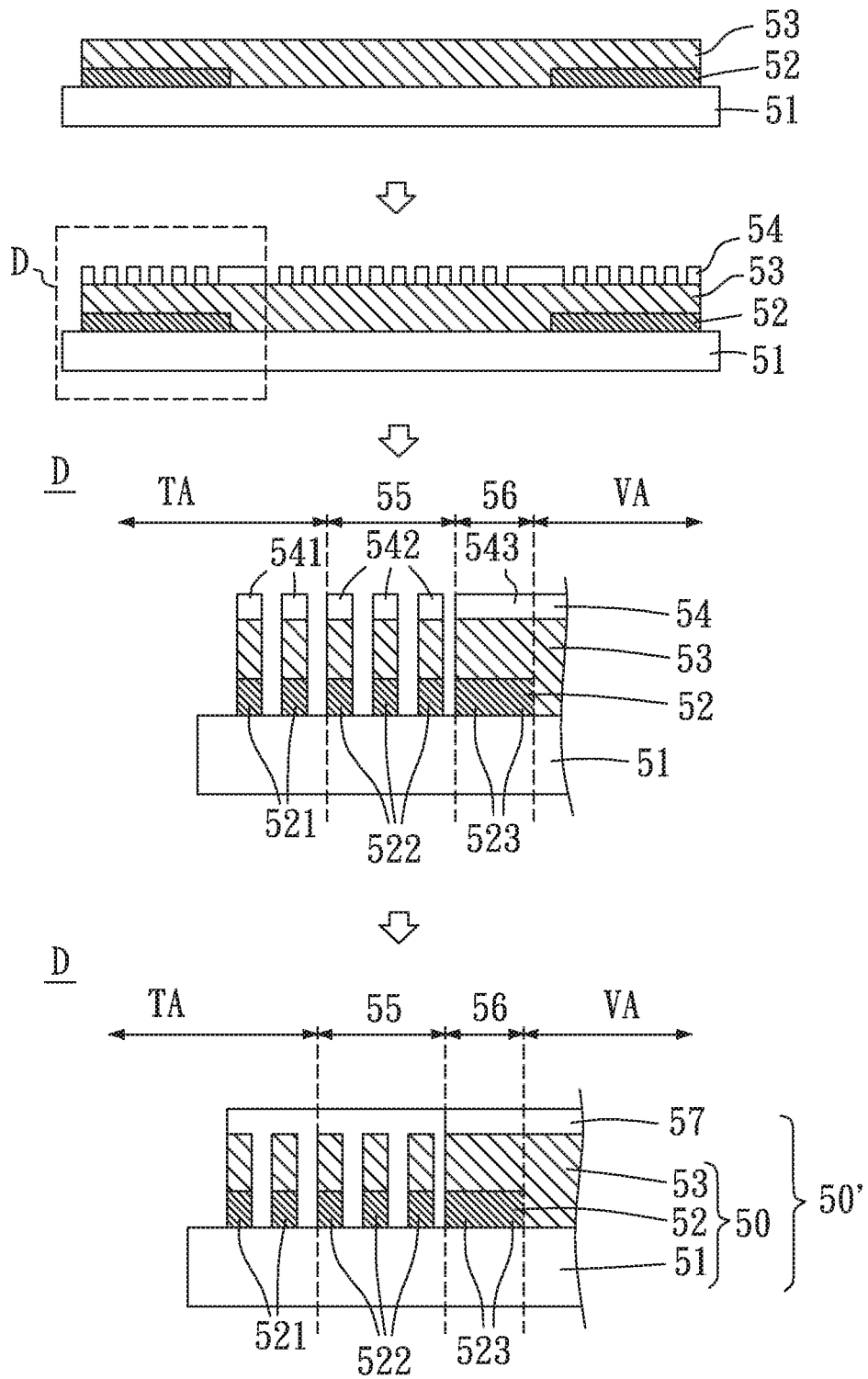
FIG. 16 is a schematic view of a touch sensor and a process of preparation thereof according to the embodiment 5 of the present disclosure.

FIG. 16 is a schematic view of a touch sensor 50' and the process of preparation thereof according to the Embodiment 5 of the disclosure. The top-down order of FIG. 16 is: 1. a schematic view after disposing a silver nanowire layer 53 and a metallic layer 52 on a substrate 51; 2. a schematic view after printing an anti-etching layer 54 on a surface of the silver nanowire layer 53; 3. a schematic view of part D after removing a part of the silver nanowire layer 53 that is not covered by the anti-etching layer 54 and the metallic layer 52 disposed therebelow with an etching liquid; and 4. a schematic view of part D after disposing a covering layer 57 on the silver nanowire layer 53. As shown in FIG. 16, the touch sensor 50' of the embodiment has a stacking structure 50 as described in Embodiment 2.

The stacking structure 50 of the touch sensor 50' of the embodiment comprises: the substrate 51; the metallic layer 52, which is disposed on the substrate 51, wherein the metallic layer 52 comprises: metallic wires 521; a metallic grid 522, which is connected to the metallic wires 521; and a metallic plate 523, which is connected to the metallic grid 522; and the silver nanowire layer 53, which is disposed on the substrate 51, wherein the silver nanowire layer 53 at least partially overlaps with the metallic layer 52. In this embodiment, the silver nanowire layer 53 is disposed on the metallic layer 52.

The stacking structure 50 of the embodiment comprises: a trace area TA, which comprises the metallic wires 521; a first lap-over area 55, which comprises the metallic grid 522; a second lap-over area 56, which comprises the metallic plate 523; and a visible area VA, which comprises an area adjacent to one side of the metallic plate 523, covered by the silver nanowire layer 53 and not covered by the metallic plate 523. In the trace area TA, the first lap-over area 55, and the second lap-over area 56, the silver nanowire layer 53 has a pattern corresponding to the metallic layer 52.

Compared to Embodiment 2, the touch sensor 50' of the embodiment further comprises the covering layer 57 which is disposed on the silver nanowire layer 53.

As shown in FIG. 16, an exemplary process for preparing the touch sensor 50' of the embodiment comprises: providing the substrate 51; disposing the metallic layer 52 and the silver nanowire layer 53 on the substrate 51, wherein the silver nanowire layer 53 is disposed on the metallic layer 52; applying flexographic printing technology to print the anti-etching layer 54 on a surface of the silver nanowire layer 53 so that the anti-etching layer 54 partially covers the silver nanowire layer 53, wherein the anti-etching layer 54 comprises: a wire pattern 541; a grid pattern 542 connected with the wire pattern 541; and a covering area 543 which covers the silver nanowire layer 53, and connects with the grid pattern 542; applying an etching technology to remove a part of the silver nanowire layer 53 that is not covered by the anti-etching layer 54 and the metallic layer 52 disposed therebelow with an etching liquid so that the metallic layer 52 comprises: the metallic wires 521, which correspond to the wire pattern 541 of the anti-etching layer 54; the metallic grid 522, which corresponds to the grid pattern 542 of the anti-etching layer 54, and connects with the metallic wires 521; and the metallic plate 523, which corresponds to the covering area 543 of the anti-etching layer 54, and connects with the metallic grid 522; removing the anti-etching layer 54; and disposing the covering layer 57 on the silver nanowire layer 53.

Embodiment 6

Figure 17:
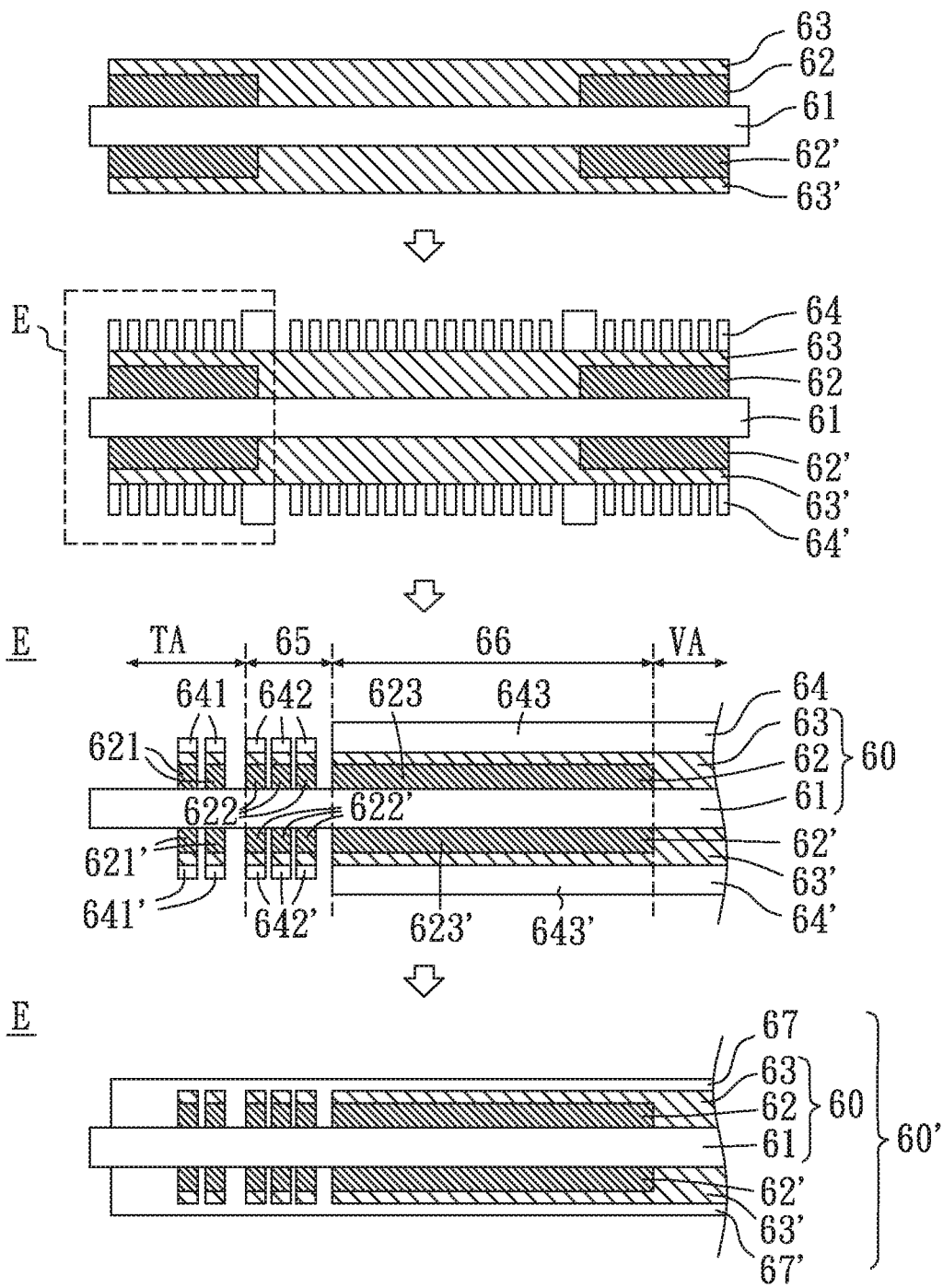
FIG. 17 is a schematic view of a touch sensor and a process of preparation thereof according to the embodiment 6 of the present disclosure.

FIG. 17 is a schematic view of a touch sensor 60' and the process of preparation thereof according to Embodiment 6 of the disclosure. The top-down order of FIG. 17 is: 1. a schematic view after disposing a silver nanowire layer 63 and a metallic layer 62 on a substrate 61 as well as disposing a second silver nanowire layer 63' and a second metallic layer 62' below the substrate 61; 2. a schematic view after printing an anti-etching layer 64 on a surface of the silver nanowire layer 63 as well as printing a second anti-etching layer 64' on a surface of the second silver nanowire layer 63'; 3. a schematic view of part E after removing a part of the silver nanowire layer 63 that is not covered by the anti-etching layer 64 and the metallic layer 62 disposed therebelow, and while removing a part of the second silver nanowire layer 63' that is not covered by the second anti-etching layer 64' and the second metallic layer 62' disposed thereon with an etching liquid; and 4. a schematic view of part E after disposing a covering layer 67 on the silver nanowire layer 63 as well as disposing a second covering layer 67' below the second silver nanowire layer 63'. Compared to Embodiment 5, two sides of the substrate 61 of the touch sensor of the embodiment have a stacking structure 60 as described in Embodiment 2.

The stacking structure 60 of the touch sensor 60' of the embodiment comprises: the substrate 61; the metallic layer 62, which is disposed on the substrate 61, wherein the metallic layer 62 comprises: metallic wires 621; a metallic grid 622, which is connected to the metallic wires 621; and a metallic plate 623, which is connected to the metallic grid 622; and the silver nanowire layer 63, which is disposed on the substrate 61, wherein the silver nanowire layer 63 at least partially overlaps with the metallic layer 62. In this embodiment, the silver nanowire layer 63 is disposed on the metallic layer 62.

The stacking structure 60 of the embodiment comprises: a trace area TA, which comprises the metallic wires 621; a first lap-over area 65, which comprises the metallic grid 622; a second lap-over area 66, which comprises the metallic plate 623; and a visible area VA, which comprises an area adjacent to one side of the metallic plate 623, covered by the silver nanowire layer 63 and not covered by the metallic plate 623. In the trace area TA, the first lap-over area 65, and the second lap-over area 66, the silver nanowire layer 63 has a pattern corresponding to the metallic layer 62.

Compared to Embodiment 2, the touch sensor 60' of the embodiment further comprises the covering layer 67 which is disposed on the silver nanowire layer 63.

Compared to Embodiment 5, the touch sensor 60' of the embodiment still further comprises: the second metallic layer 62', which is disposed below the substrate 61, wherein the second metallic layer 62' comprises: second metallic wires 621'; a second metallic grid 622', which is connected to the second metallic wires 621'; and a second metallic plate 623', which is connected to the second metallic grid 622'; the second silver nanowire layer 63', which is disposed below the substrate 61, wherein the second silver nanowire layer 63' at least partially overlaps with the second metallic layer 62'. In this embodiment, the second silver nanowire layer 63' is disposed below the second metallic layer 62'; and the second covering layer 67' is disposed below the second silver nanowire layer 63'.

As shown in FIG. 17, an exemplary process for preparing the touch sensor 60' of the embodiment comprises: providing the substrate 61; disposing the metallic layer 62 and the silver nanowire layer 63 on the substrate 61, wherein the silver nanowire layer 63 is disposed on the metallic layer 62, and disposing the second metallic layer 62' and the second silver nanowire layer 63' below the substrate 61, wherein the second silver nanowire layer 63' is disposed below the second metallic layer 62'; applying flexographic printing technology to print the anti-etching layer 64 on a surface of the silver nanowire layer 63 so that the anti-etching layer 64 partially covers the silver nanowire layer 63, wherein the anti-etching layer 64 comprises: a wire pattern 641; a grid pattern 642 connected with the wire pattern 641; and a covering area 643 which covers the silver nanowire layer 63, and connects with the grid pattern 642, and while printing the second anti-etching layer 64' on a surface of the second silver nanowire layer 63' so that the second anti-etching layer 64' partially covers the second silver nanowire layer 63', wherein the second anti-etching layer 64' comprises: a second wire pattern 641'; a second grid pattern 642' connected with the second wire pattern 641'; and a second covering area 643' which covers the second silver nanowire layer 63', and connects with the second grid pattern 642'; applying an etching technology to remove the part of the silver nanowire layer 63 that is not covered by the anti-etching layer 64 and the metallic layer 62 disposed therebelow with an etching liquid so that the metallic layer 62 comprises: the metallic wires 621, which correspond to the wire pattern 641 of the anti-etching layer 64; the metallic grid 622, which corresponds to the grid pattern 642 of the anti-etching layer 64, and connects with the metallic wires 621; and the metallic plate 623, which corresponds to the covering area 643 of the anti-etching layer 64, and connects with the metallic grid 622, and while removing the part of the second silver nanowire layer 63' that is not covered by the second anti-etching layer 64' and the second metallic layer 62' disposed thereon with the etching liquid so that the second metallic layer 62' comprises: the second metallic wires 621', which correspond to the second wire pattern 641' of the second anti-etching layer 64'; the second metallic grid 622', which corresponds to the second grid pattern 642' of the second anti-etching layer 64', and connects with the second metallic wires 621'; and the second metallic plate 623', which corresponds to the second covering area 643' of the second anti-etching layer 64', and connects with the second metallic grid 622'; removing the anti-etching layer 64 and the second anti-etching layer 64'; and disposing the covering layer 67 on the silver nanowire layer 63 as well as disposing the second covering layer 67' below the second silver nanowire layer 63'.

Embodiment 7

Figure 18:
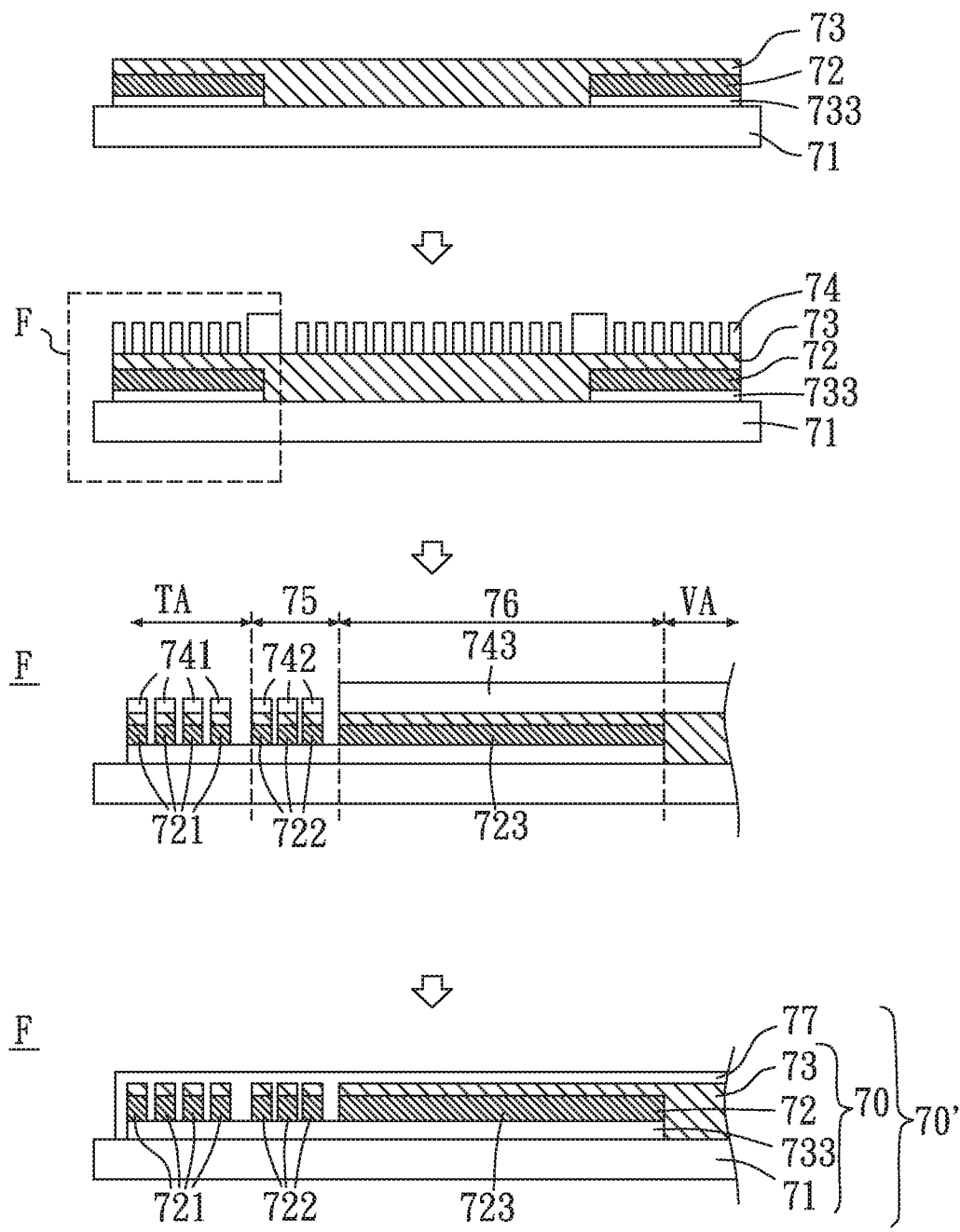
FIG. 18 is a schematic view of a touch sensor and a process of preparation thereof according to the embodiment 7 of the present disclosure.

FIG. 18 is a schematic view of a touch sensor 70' and the process of preparation thereof according to the Embodiment 7 of the disclosure. The top-down order of FIG. 18 is: 1. a schematic view after disposing a silver nanowire layer 73, a metallic layer 72 and a catalyst layer 733 on the substrate 71; 2. a schematic view after printing an anti-etching layer 74 on a surface of the silver nanowire layer 73; 3. a schematic view of part F after removing a part of the silver nanowire layer 73 that is not covered by the anti-etching layer 74 and the metallic layer 72 disposed therebelow with an etching liquid; and 4. a schematic view of part F after disposing a covering layer 77 on the silver nanowire layer 73. As shown in FIG. 18, the touch sensor 70' of the embodiment has a stacking structure 70 as described in Embodiment 3, but the bonding pad 39 is omitted.

The stacking structure 70 of the touch sensor 70' of the embodiment comprises: the substrate 71; the metallic layer 72, which is disposed on the substrate 71, wherein the metallic layer 72 comprises: metallic wires 721; a metallic grid 722, which is connected to the metallic wires 721; and a metallic plate 723, which is connected to the metallic grid 722; the catalyst layer 733, which is disposed below the metallic layer 72; and the silver nanowire layer 73, which is disposed on the substrate 71, wherein the silver nanowire layer 73 at least partially overlaps with the metallic layer 72. In this embodiment, the silver nanowire layer 73 is disposed on the metallic layer 72.

The stacking structure 70 of the embodiment comprises: a trace area TA, which comprises the metallic wires 721; a first lap-over area 75, which comprises the metallic grid 722; a second lap-over area 76, which comprises the metallic plate 723; a visible area VA, which comprises an area adjacent to one side of the metallic plate 723, covered by the silver nanowire layer 73 and not covered by the metallic plate 723. In the trace area TA, the first lap-over area 75, and the second lap-over area 76, the silver nanowire layer 73 has a pattern corresponding to the metallic layer 72.

Compared to Embodiment 3, the touch sensor 70' of the embodiment further comprises the covering layer 77 which is disposed on the silver nanowire layer 73.

As shown in FIG. 18, an exemplary process for preparing the touch sensor 70' of the embodiment comprises: providing the substrate 71; disposing the metallic layer 72 and the silver nanowire layer 73 on the substrate 71, wherein the silver nanowire layer 73 is disposed on the metallic layer 72, and the catalyst layer 733 is disposed on the substrate 71, and the metallic layer 72 is plated on the catalyst layer 733 by applying chemical plating technology to disposed the metallic layer 72; applying flexographic printing technology to print the anti-etching layer 74 on a surface of the silver nanowire layer 73 so that the anti-etching layer 74 partially covers the silver nanowire layer 73, wherein the anti-etching layer 74 comprises: a wire pattern 741; a grid pattern 742 connected with the wire pattern 741; and a covering area 743 which covers the silver nanowire layer 73, and connects with the grid pattern 742; applying an etching technology to remove a part of the silver nanowire layer 73 that is not covered by the anti-etching layer 74 and the metallic layer 72 disposed therebelow with an etching liquid so that the metallic layer 72 comprises: the metallic wires 721, which correspond to the wire pattern 741 of the anti-etching layer 74; the metallic grid 722, which corresponds to the grid pattern 742 of the anti-etching layer 74, and connects with the metallic wires 721; and the metallic plate 723, which corresponds to the covering area 743 of the anti-etching layer 74, and connects with the metallic grid 722; removing the anti-etching layer 74; and disposing the covering layer 77 on the silver nanowire layer 73.

Embodiment 8

Figure 19:
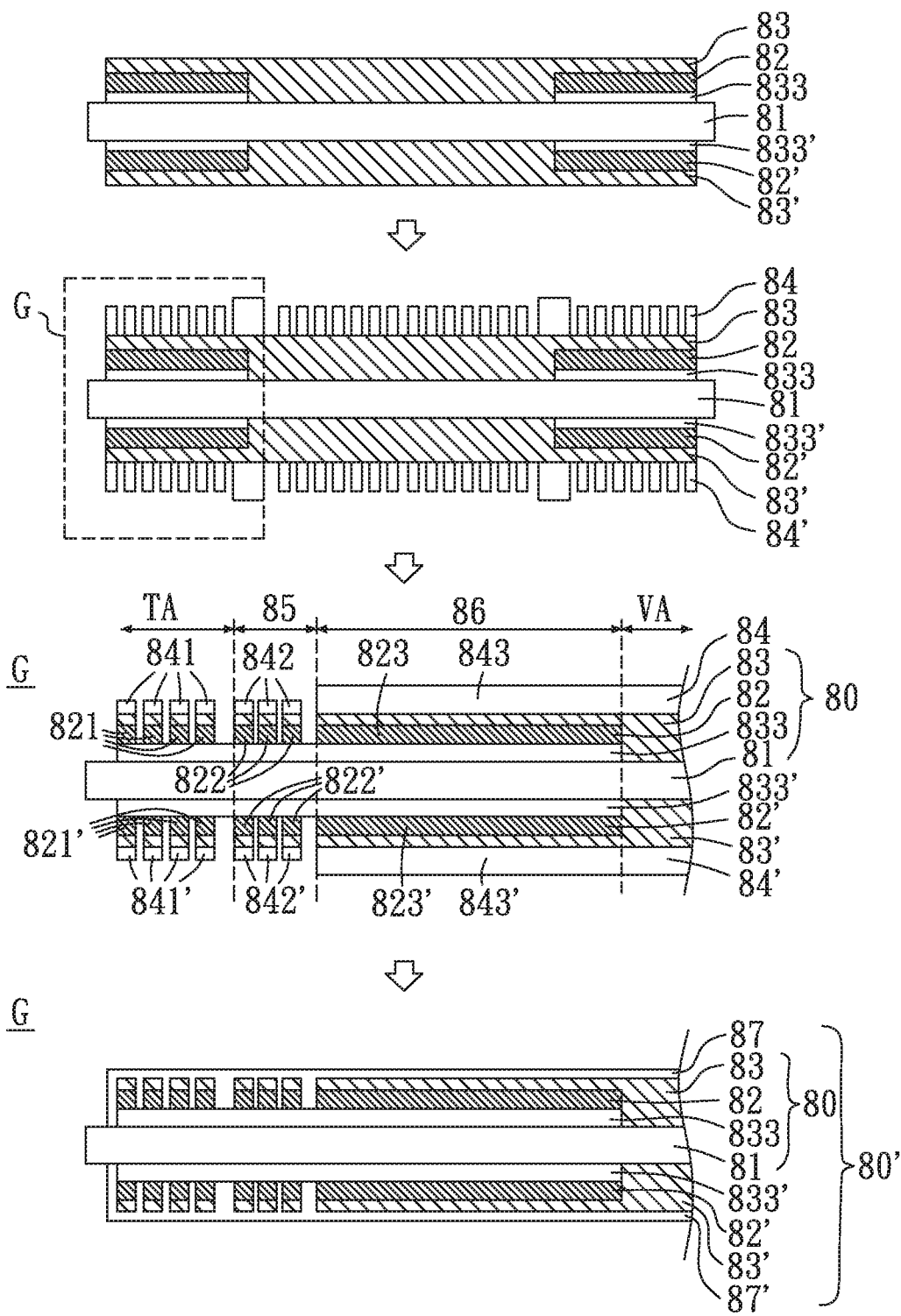
FIG. 19 is a schematic view of a touch sensor and a process of preparation thereof according to the embodiment 8 of the present disclosure.

FIG. 19 is a schematic view of a touch sensor 80' and the process of preparation thereof according to Embodiment 8 of the disclosure. The top-down order of FIG. 19 is: 1. a schematic view after disposing a silver nanowire layer 83, a metallic layer 82 and a catalyst layer 833 on the substrate 81 as well as disposing a second silver nanowire layer 83', a second metallic layer 82' and a second catalyst layer 833' below the substrate 81; 2. a schematic view after printing an anti-etching layer 84 on a surface of the silver nanowire layer 83 as well as printing a second anti-etching layer 84' on a surface of the second silver nanowire layer 83'; 3. a schematic view of part G after removing a part of the silver nanowire layer 83 that is not covered by the anti-etching layer 84 and the metallic layer 82 disposed therebelow, and while removing a part of the second silver nanowire layer 83' that is not covered by the second anti-etching layer 84' and the second metallic layer 82' disposed thereon with an etching liquid; and 4. a schematic view of part G after disposing a covering layer 87 on the silver nanowire layer 83 as well as disposing a second covering layer 87' below the second silver nanowire layer 83'. Compared to Embodiment 7, two sides of the substrate 81 of the touch sensor 80' of the embodiment have a stacking structure 80 as described in Embodiment 3, but the bonding pad 39 is omitted.

The stacking structure 80 of the touch sensor 80' of the embodiment comprises: the substrate 81; the metallic layer 82, which is disposed on the substrate 81, wherein the metallic layer 82 comprises: metallic wires 821; a metallic grid 822, which is connected to the metallic wires 821; and a metallic plate 823, which is connected to the metallic grid 822; the catalyst layer 833, which is disposed below the metallic layer 82; and the silver nanowire layer 83, which is disposed on the substrate 81, wherein the silver nanowire layer 83 at least partially overlaps with the metallic layer 82. In this embodiment, the silver nanowire layer 83 is disposed on the metallic layer 82.

The stacking structure 80 of the embodiment comprises: a trace area TA, which comprises the metallic wires 821; a first lap-over area 85, which comprises the metallic grid 822; a second lap-over area 86, which comprises the metallic plate 823; and a visible area VA, which comprises an area adjacent to one side of the metallic plate 823, covered by the silver nanowire layer 83 and not covered by the metallic plate 823. In the trace area TA, the first lap-over area 85, and the second lap-over area 86, the silver nanowire layer 83 has a pattern corresponding to the metallic layer 82.

Compared to Embodiment 3, the touch sensor 80' of the embodiment further comprises the covering layer 87 which is disposed on the silver nanowire layer 83.

Compared to Embodiment 7, the touch sensor 80' of the embodiment still further comprises: the second metallic layer 82', which is disposed below the substrate 81, wherein the second metallic layer 82' comprises: second metallic wires 821'; a second metallic grid 822', which is connected to the second metallic wires 821'; and a second metallic plate 823', which is connected to the second metallic grid 822'; the second catalyst layer 833', which is disposed below the second metallic layer 82'; the second silver nanowire layer 83', which is disposed below the substrate 81, wherein the second silver nanowire layer 83' at least partially overlaps with the second metallic layer 82'. In this embodiment, the second silver nanowire layer 83' is disposed below the second metallic layer 82'; and the second covering layer 87' is disposed below the second silver nanowire layer 83'.

As shown in FIG. 19, an exemplary process for preparing the touch sensor 80' of the embodiment comprises: providing the substrate 81; disposing the metallic layer 82 and the silver nanowire layer 83 on the substrate 81, wherein the silver nanowire layer 83 is disposed on the metallic layer 82, and disposing the second metallic layer 82' and the second silver nanowire layer 83' below the substrate 81, wherein the second silver nanowire layer 83' is disposed below the second metallic layer 82', and the catalyst layer 833 is disposed on the substrate 81, and the metallic layer 82 is plated on the catalyst layer 833 by applying chemical plating technology to dispose the metallic layer 82 on the catalyst layer 833, and the second catalyst layer 833' is disposed below the substrate 81, and the second metallic layer 82' is plated below the second catalyst layer 833' by applying chemical plating technology to disposed the second metallic layer 82' on the second catalyst layer 833'; applying flexographic printing technology to print the anti-etching layer 84 on a surface of the silver nanowire layer 83 so that the anti-etching layer 84 partially covers the silver nanowire layer 83, wherein the anti-etching layer 84 comprises: a wire pattern 841; a grid pattern 842 connected with the wire pattern 841; and a covering area 843 which covers the silver nanowire layer 83, and connects with the grid pattern 842, and while printing the second anti-etching layer 84' on a surface of the second silver nanowire layer 83' so that the second anti-etching layer 84' partially covers the second silver nanowire layer 83', wherein the second anti-etching layer 84' comprises: a second wire pattern 841'; a second grid pattern 842' connected with the second wire pattern 841'; and a second covering area 843' which covers the second silver nanowire layer 83', and connects with the second grid pattern 842'; applying an etching technology to remove the part of the silver nanowire layer 83 that is not covered by the anti-etching layer 84 and the metallic layer 82 disposed therebelow with an etching liquid so that the metallic layer 82 comprises: the metallic wires 821, which correspond to the wire pattern 841 of the anti-etching layer 84; the metallic grid 822, which corresponds to the grid pattern 842 of the anti-etching layer 84, and connects with the metallic wires 821; and the metallic plate 823, which corresponds to the covering area 843 of the anti-etching layer 84, and connects with the metallic grid 822, and while removing the part of the second silver nanowire layer 83' that is not covered by the second anti-etching layer 84' and the second metallic layer 82' disposed thereon with the etching liquid so that the second metallic layer 82' comprises: the second metallic wires 821', which correspond to the second wire pattern 841' of the second anti-etching layer 84'; the second metallic grid 822', which corresponds to the second grid pattern 842' of the second anti-etching layer 84', and connects with the second metallic wires 821'; and the second metallic plate 823', which corresponds to the second covering area 843' of the second anti-etching layer 84', and connects with the second metallic grid 822'; removing the anti-etching layer 84 and the second anti-etching layer 84'; and disposing the covering layer 87 on the silver nanowire layer 83 as well as disposing the second covering layer 87' below the second silver nanowire layer 83'.

Embodiment 9

Figure 20:
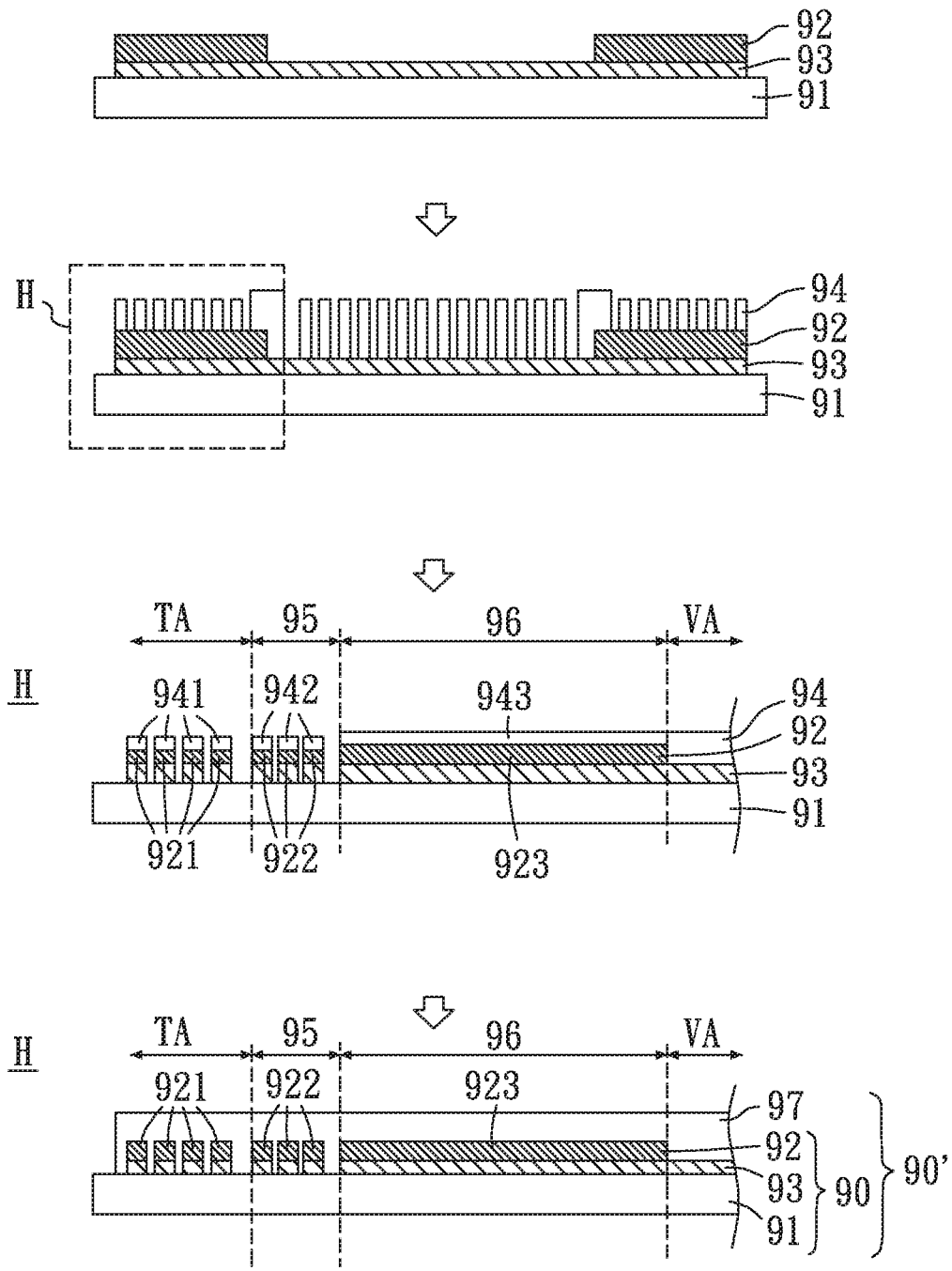
FIG. 20 is a schematic view of a touch sensor and a process of preparation thereof according to the embodiment 9 of the present disclosure.

FIG. 20 is a schematic view of a touch sensor 90' and the process of preparation thereof according to Embodiment 9 of the disclosure. The top-down order of FIG. 20 is: 1. a schematic view after disposing a silver nanowire layer 93 and a metallic layer 92 on a substrate 91; 2. a schematic view after printing an anti-etching layer 94 on a surface of the metallic layer 92; 3. a schematic view of part H after removing a part of the metallic layer 92 that is not covered by the anti-etching layer 94 and the silver nanowire layer 93 disposed therebelow with an etching liquid; and 4. a schematic view of part H after disposing a covering layer 97 on the metallic layer 92. As shown in FIG. 20, the touch sensor 90' of the embodiment has a stacking structure 90 as described in Embodiment 4.

The stacking structure 90 of the touch sensor 90' of the embodiment comprises: the substrate 91; the metallic layer 92, which is disposed on the substrate 91, wherein the metallic layer 92 comprises: metallic wires 921; a metallic grid 922, which is connected to the metallic wires 921; and a metallic plate 923, which is connected to the metallic grid 922; and the silver nanowire layer 93, which is disposed on the substrate 91, wherein the silver nanowire layer 93 at least partially overlaps with the metallic layer 92. In this embodiment, the metallic layer 92 is disposed on the silver nanowire layer 93.

The stacking structure 90 of the embodiment comprises: a trace area TA, which comprises the metallic wires 921; a first lap-over area 95, which comprises the metallic grid 922; a second lap-over area 96, which comprises the metallic plate 923; and a visible area VA, which comprises an area adjacent to one side of the metallic plate 923, covered by the silver nanowire layer 93 and not covered by the metallic plate 923. In the trace area TA, the first lap-over area 95, and the second lap-over area 96, the silver nanowire layer 93 has a pattern corresponding to the metallic layer 92.

Compared to Embodiment 4, the touch sensor 90' of the embodiment further comprises the covering layer 97 which is disposed on the silver nanowire layer 93.

As shown in FIG. 20, an exemplary process for preparing the touch sensor 90' of the embodiment comprises: providing the substrate 91; disposing the metallic layer 92 and the silver nanowire layer 93 on the substrate 91, wherein the metallic layer 92 is disposed on the silver nanowire layer 93; applying flexographic printing technology to print the anti-etching layer 94 on a surface of the metallic layer 92 so that the anti-etching layer 94 partially covers the metallic layer 92, wherein the anti-etching layer 94 comprises: a wire pattern 941; a grid pattern 942 connected with the wire pattern 941; and a covering area 943 which covers the metallic layer 92, and connects with the grid pattern 942; applying an etching technology to remove the part of the metallic layer 92 that is not covered by the anti-etching layer 94 and the silver nanowire layer 93 disposed therebelow with an etching liquid so that the metallic layer 92 comprises: the metallic wires 921, which correspond to the wire pattern 941 of the anti-etching layer 94; the metallic grid 922, which corresponds to the grid pattern 942 of the anti-etching layer 94, and connects with the metallic wires 921; and the metallic plate 923, which corresponds to the covering area 943 of the anti-etching layer 94, and connects with the metallic grid 922; removing the anti-etching layer 94; and disposing the covering layer 97 on the metallic layer 92.

Embodiment 10

Figure 21:
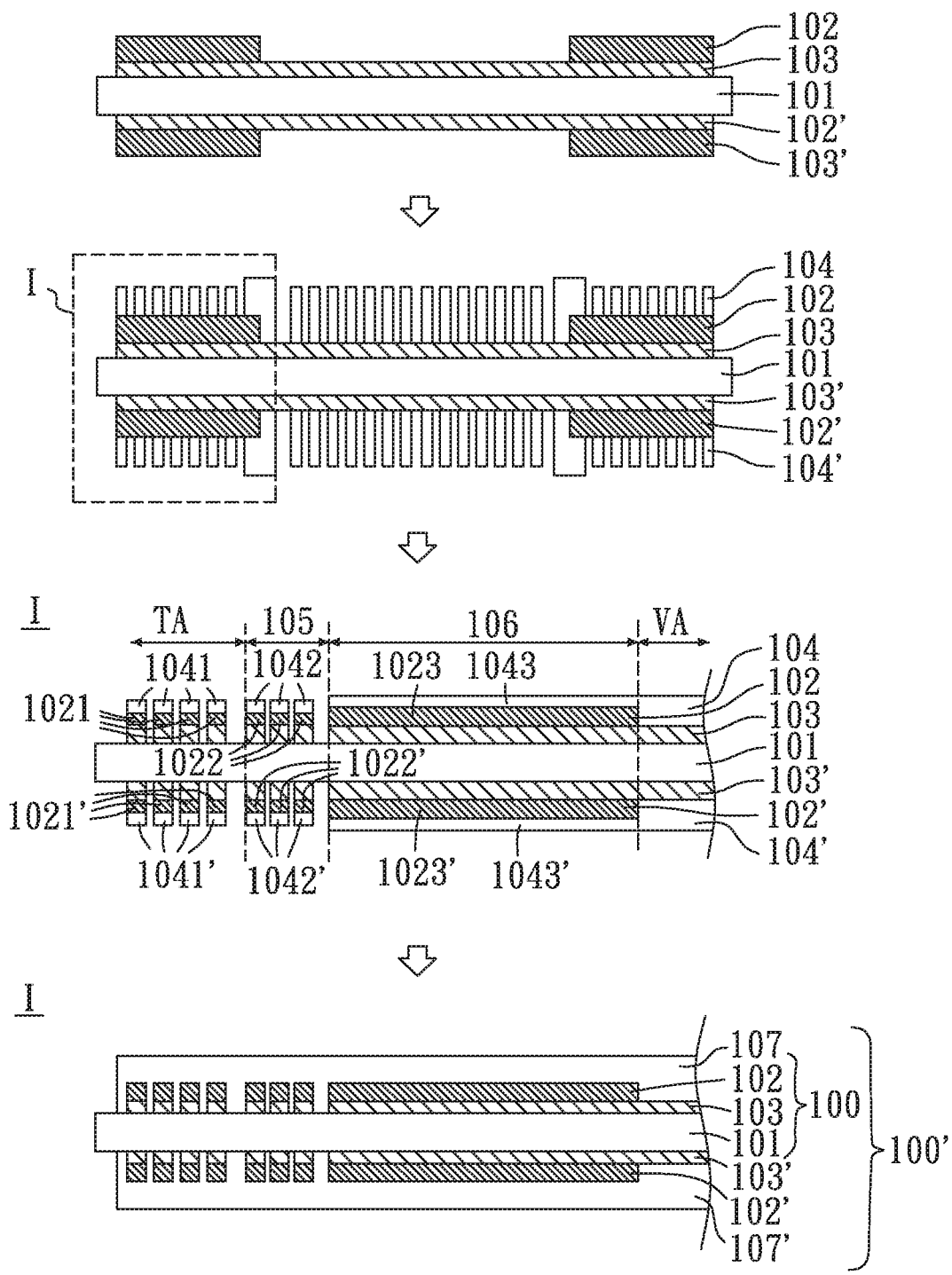
FIG. 21 is a schematic view of a touch sensor and a process of preparation thereof according to the embodiment 10 of the present disclosure.

FIG. 21 is a schematic view of a touch sensor 100' and the process of preparation thereof according to Embodiment 10 of the disclosure. The top-down order of FIG. 21 is: 1. a schematic view after disposing a silver nanowire layer 103 and a metallic layer 102 on a substrate 101 as well as disposing a second silver nanowire layer 103' and a second metallic layer 102' below the substrate 101; 2. a schematic view after printing an anti-etching layer 104 on a surface of the metallic layer 102 as well as printing a second anti-etching layer 104' on a surface of the second metallic layer 102'; 3. a schematic view of part I after removing a part of the metallic layer 102 that is not covered by the anti-etching layer 104 and the silver nanowire layer 103 disposed therebelow, and while removing a part of the second metallic layer 102' that is not covered by the second anti-etching layer 104' and the second silver nanowire layer 103' disposed thereon with an etching liquid; and 4. a schematic view of part I after disposing a covering layer 107 on the metallic layer 102 as well as disposing a second covering layer 107' below the second metallic layer 102'. Compared to Embodiment 9, two sides of the substrate 1010 of the touch sensor 100' of the embodiment have a stacking structure 100 as described in Embodiment 4.

The stacking structure 100 of the touch sensor 100' of the embodiment comprises: the substrate 101; the metallic layer 102, which is disposed on the substrate 101, wherein the metallic layer 102 comprises: metallic wires 1021; a metallic grid 1022, which is connected to the metallic wires 1021; and a metallic plate 1023, which is connected to the metallic grid 1022; and the silver nanowire layer 103, which is disposed on the substrate 101, wherein the silver nanowire layer 103 at least partially overlaps with the metallic layer 102. In this embodiment, the metallic layer 102 is disposed on the silver nanowire layer 103.

The stacking structure 100 of the embodiment comprises: a trace area TA, which comprises the metallic wires 1021; a first lap-over area 105, which comprises the metallic grid 1022; a second lap-over area 106, which comprises the metallic plate 1023; and a visible area VA, which comprises an area adjacent to one side of the metallic plate 1023, covered by the silver nanowire layer 103 and not covered by the metallic plate 1023. In the trace area TA, the first lap-over area 105, and the second lap-over area 106, the silver nanowire layer 103 has a pattern corresponding to the metallic layer 102.

Compared to Embodiment 4, the touch sensor 100' of the embodiment further comprises the covering layer 107 which is disposed on the silver nanowire layer 103.

Compared to Embodiment 9, the touch sensor 100' of the embodiment still further comprises: the second metallic layer 102', which is disposed below the substrate 101, wherein the second metallic layer 102' comprises: second metallic wires 1021'; a second metallic grid 1022', which is connected to the second metallic wires 1021'; and a second metallic plate 1023', which is connected to the second metallic grid 1022'; and the second silver nanowire layer 103', which is disposed below the substrate 101, wherein the second silver nanowire layer 103' at least partially overlaps with the second metallic layer 102'. In this embodiment, the second metallic layer 102' is disposed below the second silver nanowire layer 103'; and the second covering layer 107' is disposed below the second metallic layer 102'.

As shown in FIG. 21, an exemplary process for preparing the touch sensor 100' of the embodiment comprises: providing the substrate 101; disposing the metallic layer 102 and the silver nanowire layer 103 on the substrate 101, wherein the metallic layer 102 is disposed on the silver nanowire layer 103, and disposing the second metallic layer 102' and the second silver nanowire layer 103' below the substrate 101, wherein the second metallic layer 102' is disposed below the second silver nanowire layer 103'; applying flexographic printing technology to print the anti-etching layer 104 on a surface of the metallic layer 102 so that the anti-etching layer 104 partially covers the metallic layer 102, wherein the anti-etching layer 104 comprises: a wire pattern 1041; a grid pattern 1042 connected with the wire pattern 1041; and a covering area 1043 which covers the metallic layer 102, and connects with the grid pattern 1042, and while printing the second anti-etching layer 104' on a surface of the second metallic layer 102' so that the second anti-etching layer 104' partially covers the second metallic layer 102', wherein the second anti-etching layer 104' comprises: a second wire pattern 1041'; a second grid pattern 1042' connected with the second wire pattern 1041'; and a second covering area 1043' which covers the second metallic layer 102', and connects with the second grid pattern 1042'; applying an etching technology to remove the part of the metallic layer 102 that is not covered by the anti-etching layer 104 and the silver nanowire layer 103 disposed therebelow with an etching liquid so that the metallic layer 102 comprises: the metallic wires 1021, which correspond to the wire pattern 1041 of the anti-etching layer 104; the metallic grid 1022, which corresponds to the grid pattern 1042 of the anti-etching layer 104, and connects with the metallic wires 1021; and the metallic plate 1023, which corresponds to the covering area 1043 of the anti-etching layer 104, and connects with the metallic grid 1022, and while removing the part of the second metallic layer 102' that is not covered by the second anti-etching layer 104' and the second silver nanowire layer 103' disposed thereon with the etching liquid so that the second metallic layer 102' comprises: the second metallic wires 1021', which correspond to the second wire pattern 1041' of the second anti-etching layer 104'; the second metallic grid 1022', which corresponds to the second grid pattern 1042' of the second anti-etching layer 104', and connects with the second metallic wires 1021'; and the second metallic plate 1023', which corresponds to the second covering area 1043' of the second anti-etching layer 104', and connects with the second metallic grid 1022'; removing the anti-etching layer 104 and the second anti-etching layer 104'; and disposing the covering layer 107 on the silver nanowire layer 103 as well as disposing the second covering layer 107' below the second silver nanowire layer 103'.

In conclusion, the method for preparing the stacking structure, the stacking structure and the touch sensor of the present disclosure have at least the following excellent technical effects: 1. The method for preparing the stacking structure of the present disclosure prints the anti-etching layer by applying flexographic printing technology, which can effectively define the first lap-over area and the second lap-over area with different pattern designs to form a differentiated special stacking design. 2. The method for preparing the stacking structure of the present disclosure prints the anti-etching layer by applying flexographic printing technology, which can dispense with the exposure and development process, solve the problem of double-sided exposure, decrease wastewater treatment, and reduce costs to improve performance. 3. The metallic layer of the stacking structure of the present disclosure comprises a metallic grid so that the stacking structure and the touch sensor comprising the stacking structure have a unique stacking design in the first lap-over area. Compared to conventional metallic sheets, the metallic grid can decrease the consumption of metallic raw materials to reduce the cost of preparing the stacking structure and the touch sensor comprising the stacking structure, thus enabling the touch sensor with ultra-narrow bezel (square).

The above embodiments only illustrate the present disclosure and are not to be used to limit the present disclosure. While the present disclosure has been described by means of specific embodiments, numerous modifications and variations could be made thereto by those skilled in the art without departing from the scope and spirit of the present disclosure set forth in the claims. Therefore, the scope of the right protection of the present invention shall be indicated by the appended claims.

What is claimed is:

1. A method for preparing a stacking structure, comprising:
   providing a substrate;
   disposing a metallic layer and a silver nanowire layer on the substrate;
   applying flexographic printing technology to print an anti-etching layer on a surface of the metallic layer or a surface of the silver nanowire layer so that the anti-etching layer partially covers the metallic layer or the silver nanowire layer, wherein the anti-etching layer comprises:
   a wire pattern;
   a grid pattern connected with the wire pattern; and
   a covering area which covers the metallic layer or the silver nanowire layer and connects with the grid pattern;
   applying an etching technology to remove a part of the metallic layer or a part of the silver nanowire layer that is not covered by the anti-etching layer and the metallic layer or the silver nanowire layer disposed therebelow with an etching liquid so that the metallic layer comprises:
   metallic wires, which correspond to the wire pattern of the anti-etching layer;
   a metallic grid, which corresponds to the grid pattern of the anti-etching layer and connects with the metallic wires; and
   a metallic plate, which corresponds to the covering area of the anti-etching layer and connects with the metallic grid, wherein the metallic wires, the metallic grid and the metallic plate are disposed outside of a visible area of the stacking structure, and the metallic grid is laterally between the metallic wires and the metallic plate such that a sidewall of the metallic plate faces a first sidewall of the metallic grid and a second sidewall of the metallic grid faces a sidewall of at least one of the metallic wires; and
   removing the anti-etching layer.

2. The method for preparing the stacking structure according to claim 1, wherein the silver nanowire layer is disposed on the metallic layer, and the anti-etching layer is printed on the surface of the silver nanowire layer.

3. The method for preparing the stacking structure according to claim 1, wherein the metallic layer is disposed by applying chemical plating technology.

4. The method for preparing the stacking structure according to claim 1, wherein the metallic layer is disposed on the silver nanowire layer, and the anti-etching layer is printed on the surface of the metallic layer.

5. The method for preparing the stacking structure according to claim 1, wherein a material of the metallic layer is selected from the group consisting of copper, copper-nickel alloy, copper-lead alloy, silver, silver-nickel alloy and silver-lead alloy.

6. The method for preparing the stacking structure according to claim 1, wherein a material of the substrate is selected from the group consisting of polyethylene terephthalate (PET), cyclic olefin copolymer (COP), colorless polyimide (CPI), polyethylene naphthalate (PEN), polycarbonate (PC) and polyethersulfone (PES).

7. A stacking structure, comprising:
   a substrate;
   a metallic layer, which is disposed on the substrate, wherein the metallic layer comprises:
   metallic wires;
   a metallic grid, which is connected to the metallic wires; and
   a metallic plate, which is connected to the metallic grid, wherein the metallic wires, the metallic grid and the metallic plate are disposed outside of a visible area of the stacking structure, and the metallic grid is laterally between the metallic wires and the metallic plate such that a sidewall of the metallic plate faces a first sidewall of the metallic grid and a second sidewall of the metallic grid faces a sidewall of at least one of the metallic wires; and
   a silver nanowire layer, which is disposed on the substrate, wherein the silver nanowire layer at least partially overlaps with the metallic layer.

8. The stacking structure according to claim 7, wherein the silver nanowire layer is disposed on the metallic layer.

9. The stacking structure according to claim 7, further comprising:
   a catalyst layer, which is disposed below the metallic layer.

10. The stacking structure according to claim 7, wherein the metallic layer is disposed on the silver nanowire layer.

11. The stacking structure according to claim 7, wherein a material of the metallic layer is selected from the group consisting of copper, copper-nickel alloy, copper-lead alloy, silver, silver-nickel alloy and silver-lead alloy.

12. The stacking structure according to claim 7, wherein a material of the substrate is selected from the group consisting of polyethylene terephthalate (PET), cyclic olefin copolymer (COP), colorless polyimide (CPI), polyethylene naphthalate (PEN), polycarbonate (PC) and polyethersulfone (PES).

13. The stacking structure according to claim 7, wherein the stacking structure comprises:
 a trace area, which comprises the metallic wires;
 a first lap-over area, which comprises the metallic grid; and
 a second lap-over area, which comprises the metallic plate, wherein the visible area, which comprises an area adjacent to one side of the metallic plate, is covered by the silver nanowire layer and not covered by the metallic plate, and in the trace area, the first lap-over area and the second lap-over area, the silver nanowire layer has a pattern corresponding to the metallic layer.

14. The stacking structure according to claim 13, wherein a total width of the first lap-over area and the second lap-over area is less than 500 μm, and a ratio of a width of the first lap-over area to a width of the second lap-over area is between 0.05 and 20.

15. The stacking structure according to claim 13, wherein a total width of the first lap-over area and the second lap-over area is between 0.5 mm and 1.0 mm, and a ratio of a width of the first lap-over area to a width of the second lap-over area is between 0.03 and 35.

16. The stacking structure according to claim 13, wherein a total width of the first lap-over area and the second lap-over area is between 1.0 mm and 1.5 mm, and a ratio of a width of the first lap-over area to a width of the second lap-over area is between 0.02 and 50.

17. The stacking structure according to claim 13, wherein a total width of the first lap-over area and the second lap-over area is between 1.5 mm and 2.5 mm, and a ratio of a width of the first lap-over area to a width the second lap-over area is between 0.01 and 100.

18. The stacking structure according to claim 13, wherein a ratio of a total width of the first lap-over area and the second lap-over area to a width of the trace area is 2:1, the metallic layer comprises 1-50 metallic wires, and a ratio of a width of the first lap-over area to a width of the second lap-over area is between 0.05 and 20.

19. The stacking structure according to claim 13, wherein a ratio of a total width of the first lap-over area and the second lap-over area to a width of the trace area is 1:1, the metallic layer comprises 10-100 metallic wires, and a ratio of a width of the first lap-over area to a width of the second lap-over area is between 0.03 and 35.

20. The stacking structure according to claim 13, wherein a ratio of a total width of the first lap-over area and the second lap-over area to a width of the trace area is 3:1, the metallic layer comprises 1-50 metallic wires, and a ratio of a width of the first lap-over area to a width of the second lap-over area is between 0.02 and 50.

21. The stacking structure according to claim 13, wherein a pitch of the metallic grid of the first lap-over area to a pitch of the metallic wires is 0.1-10 times, and a line width of the metallic grid of the first lap-over area to a line width of the metallic wires is 0.1-5 times.

22. The stacking structure according to claim 13, wherein the metallic wires have a pitch of 20 μm, a line width of 10 μm and a line space of 10 μm, and the metallic grid of the first lap-over area has a pitch between 2 μm and 200 μm and a line width between about 2 μm and 50 μm.

23. The stacking structure according to claim 22, wherein a line width/line space of the metallic grid of the first lap-over area is 5 μm/5 μm, 10 μm/5 μm, 15 μm/5 μm, 20 μm/5 μm, 40 μm/5 μm, 50 μm/5 μm, 50 μm/150 μm, 40 μm/150 μm, 30 μm/150 μm or 20 μm/150 μm.

24. The stacking structure according to claim 13, wherein the metallic wires have a pitch of 40 μm, a line width of 20 μm and a line space of 20 μm, and the metallic grid of the first lap-over area has a pitch between 4 μm and 400 μm and a line width between about 4 μm and 100 μm.

25. The stacking structure according to claim 24, wherein a line width/line space of the metallic grid of the first lap-over area is 20 μm/5 μm, 40 μm/5 μm, 80 μm/5 μm, 100 μm/5 μm, 20 μm/80 μm, 40 μm/60 μm, 100 μm/200 μm or 100 μm/300 μm.

26. The stacking structure according to claim 13, wherein the metallic wires have a line width between 3 μm and 30 μm, and a line space between 3 μm and 30 μm.

27. The stacking structure according to claim 13, further comprising:
 a bonding pad, which is disposed on the substrate, the bonding pad comprising:
  a bonding metallic layer, which is disposed on the substrate, wherein the bonding metallic layer comprises:
   a bonding metallic grid;
   a bonding metallic plate, which is connected to the bonding metallic grid; and
  a bonding silver nanowire layer, which is disposed on the substrate.

28. A touch sensor, comprising:
 a stacking structure, comprising:
  a substrate;
  a metallic layer, which is disposed on the substrate, wherein the metallic layer comprises:
   metallic wires;
   a metallic grid, which is connected to the metallic wires; and
   a metallic plate, which is connected to the metallic grid, wherein the metallic wires, the metallic grid and the metallic plate are disposed outside of a visible area of the stacking structure, and the metallic grid is laterally between the metallic wires and the metallic plate such that a sidewall of the metallic plate faces a first sidewall of the metallic grid and a second sidewall of the metallic grid faces a sidewall of at least one of the metallic wires; and
  a silver nanowire layer, which is disposed on the substrate, wherein the silver nanowire layer at least partially overlaps with the metallic layer; and
 a covering layer, which is disposed on the metallic layer or the silver nanowire layer of the stacking structure.

29. The touch sensor according to claim 28, further comprising:
 a second metallic layer, which is disposed below the substrate in the stacking structure, wherein the second metallic layer comprises:
  second metallic wires;
  a second metallic grid, which is connected to the second metallic wires; and
  a second metallic plate, which is connected to the second metallic grid;
 a second silver nanowire layer, which is disposed below the substrate, wherein the second silver nanowire layer at least partially overlaps with the second metallic layer; and a second covering layer, which is disposed below the second metallic layer and the second silver nanowire layer.

\* \* \* \* \*